(12) United States Patent
Sekiguchi et al.

(10) Patent No.: US 11,251,470 B2
(45) Date of Patent: Feb. 15, 2022

(54) SECONDARY BATTERY, BATTERY PACK, VEHICLE, AND STATIONARY POWER SOURCE

(71) Applicant: Kabushiki Kaisha Toshiba, Minato-ku (JP)

(72) Inventors: Yumiko Sekiguchi, Kawasaki (JP); Shinsuke Matsuno, Minato (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 98 days.

(21) Appl. No.: 16/718,496

(22) Filed: Dec. 18, 2019

(65) Prior Publication Data

US 2020/0303783 A1   Sep. 24, 2020

(30) Foreign Application Priority Data

Mar. 18, 2019  (JP) .............................. JP2019-050174
Oct. 28, 2019   (JP) .............................. JP2019-195333

(51) Int. Cl.
| | | |
|---|---|---|
| *H01M 14/00* | (2006.01) | |
| *H01M 10/26* | (2006.01) | |
| *H01M 10/42* | (2006.01) | |
| *H01M 4/66*  | (2006.01) | |
| *H01M 4/485* | (2010.01) | |

(Continued)

(52) U.S. Cl.
CPC .............. *H01M 10/26* (2013.01); *H01M 4/24* (2013.01); *H01M 4/48* (2013.01); *H01M 4/485* (2013.01); *H01M 4/661* (2013.01); *H01M 10/425* (2013.01); *H01M 50/20* (2021.01);

(Continued)

(58) Field of Classification Search
CPC .... H01M 10/26; H01M 10/425; H01M 50/20; H01M 4/24; H01M 4/48; H01M 4/485; H01M 4/661; H01M 2004/027; H01M 2010/4271; H01M 2300/0014
See application file for complete search history.

(56) References Cited

U.S. PATENT DOCUMENTS

| | | | |
|---|---|---|---|
| 2006/0040182 A1* | 2/2006 | Kawakami | ......... H01M 10/052 429/218.1 |
| 2013/0078504 A1* | 3/2013 | Yasuda | ................. H01M 4/366 429/163 |

(Continued)

FOREIGN PATENT DOCUMENTS

| | | | | |
|---|---|---|---|---|
| JP | 5586553 B2 | 9/2014 | | |
| JP | 2014-212133 | * 11/2014 | | ............. H01M 4/13 |
| JP | 6321287 B2 | 5/2018 | | |

*Primary Examiner* — Raymond Alejandro
(74) *Attorney, Agent, or Firm* — Oblon, McClelland, Maier & Neustadt, L.L.P.

(57) ABSTRACT

A secondary battery includes a positive electrode, a negative electrode and an electrolyte containing aqueous electrolyte. The negative electrode is provided with a negative electrode current collector having a compound including aluminum, and a negative electrode active material including titanium on a granule surface of the negative electrode current collector. A ratio of an atomic concentration of aluminum atoms to sum of atomic concentrations of aluminum atoms and titanium atoms on a surface of the negative electrode ({Al atomic concentration/(Al atomic concentration+Ti atomic concentration)}×100) is 3 atm % or more and 30 atm % or less.

14 Claims, 7 Drawing Sheets

(51) Int. Cl.
*H01M 4/24* (2006.01)
*H01M 4/48* (2010.01)
*H01M 50/20* (2021.01)
*H01M 4/02* (2006.01)

(52) U.S. Cl.
CPC ............... *H01M 2004/027* (2013.01); *H01M 2010/4271* (2013.01); *H01M 2300/0014* (2013.01)

(56) References Cited

U.S. PATENT DOCUMENTS

| | | |
|---|---|---|
| 2017/0222272 A1 | 8/2017 | Takami et al. |
| 2018/0083321 A1 | 3/2018 | Hotta et al. |
| 2018/0277813 A1 | 9/2018 | Yoshima et al. |
| 2018/0277899 A1* | 9/2018 | Takami ............... H01M 10/054 |
| 2019/0088999 A1 | 3/2019 | Sekiguchi et al. |
| 2019/0089011 A1 | 3/2019 | Seki et al. |

* cited by examiner

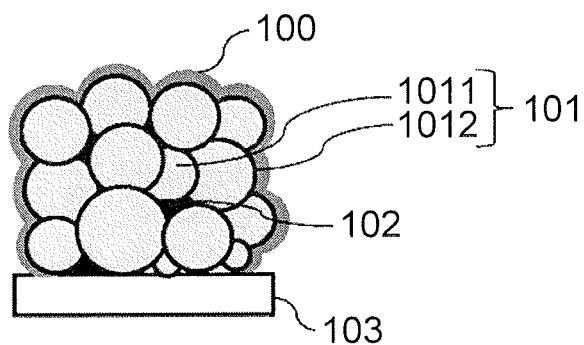
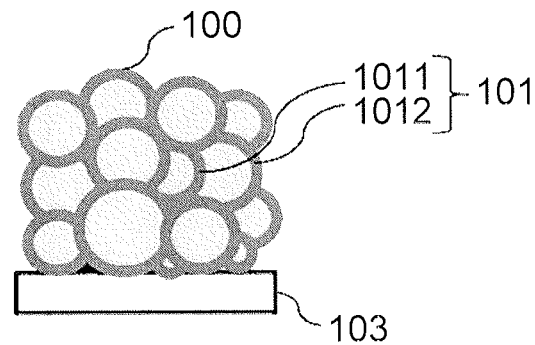
FIG. 1A    FIG. 1B
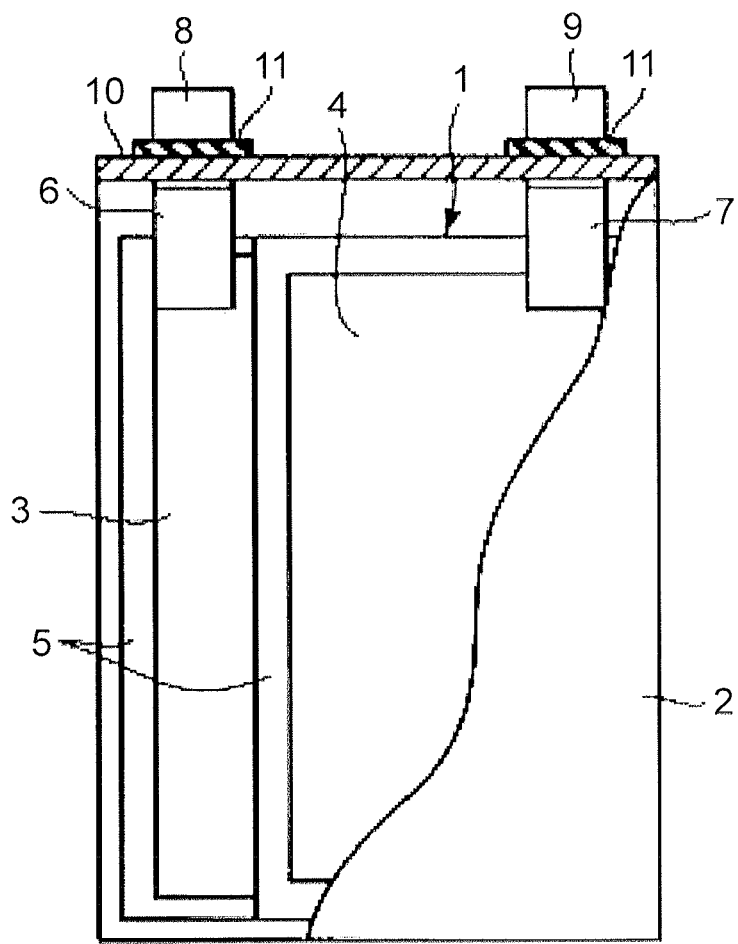
FIG. 2

SECONDARY BATTERY, BATTERY PACK, VEHICLE, AND STATIONARY POWER SOURCE

CROSS-REFERENCE TO RELATED APPLICATIONS

This application is based upon and claims the benefit of priority from Japanese Patent Application No. 2019-050174, filed on Mar. 18, 2019, and Japanese Patent Application No. 2019-195333, filed on Oct. 28, 2019, the entire contents of which are incorporated herein by reference.

FIELD

Embodiments described herein relate generally to a secondary battery, a battery pack, a vehicle, and a stationary power source.

BACKGROUND

Non-aqueous electrolyte batteries using a carbon material or lithium titanium oxide as a negative electrode active material and layered oxide containing nickel, cobalt, manganese, and the like as a positive electrode active material, particularly secondary batteries have already been put to practical use as a power source in a wide range of fields.

The batteries range from small ones for various electronic devices to large ones for electric vehicles. A non-aqueous organic solvent mixed with ethylene carbonate, methyl ethyl carbonate, or the like is used for electrolytes of these secondary batteries, unlike nickel-metal hydride batteries and lead storage batteries.

The electrolytes using these solvents are higher in oxidation resistance and reduction resistance than an aqueous electrolyte (water-based electrolyte), and electrolysis of the solvents is less likely to occur. Therefore, in a non-aqueous secondary battery, a high electromotive force of 2 V to 4.5 V can be realized.

On the other hand, most of organic solvents are flammable substances, and the safety of the secondary battery is in principle inferior to that of a secondary battery using an aqueous solution.

Although various measures have been taken to improve the safety of the secondary battery using an organic solvent electrolyte, it is not necessarily sufficient. Further, since the non-aqueous secondary battery requires a dry environment in the manufacturing process, the manufacturing cost is inevitably high. In addition, since the organic solvent electrolyte is inferior to conductivity, the internal resistance of the non-aqueous secondary battery tends to be high. Such a problem is a significant problem in an electric car and a hybrid electric car in which battery safety and battery cost are regarded as important and further in a large storage battery application for power storage. In order to solve the problem of non-aqueous secondary batteries, secondary batteries using an aqueous electrolyte have been proposed. However, since the active material can be easily peeled off from the current collector by the electrolysis of the aqueous solution electrolyte, the operation of the secondary battery is not stable, and there is a problem in performing satisfactory charge and discharge.

BRIEF DESCRIPTION OF THE DRAWINGS

FIG. 1A is a schematic cross-sectional view of an electrode provided in a secondary battery according to a first embodiment, FIG. 1B is a schematic cross sectional view of an electrode provided in a conventional secondary battery;

FIG. 2 is a partial cutaway cross-sectional view of the secondary battery according to the first embodiment;

DETAILED DESCRIPTION

Figure 3:
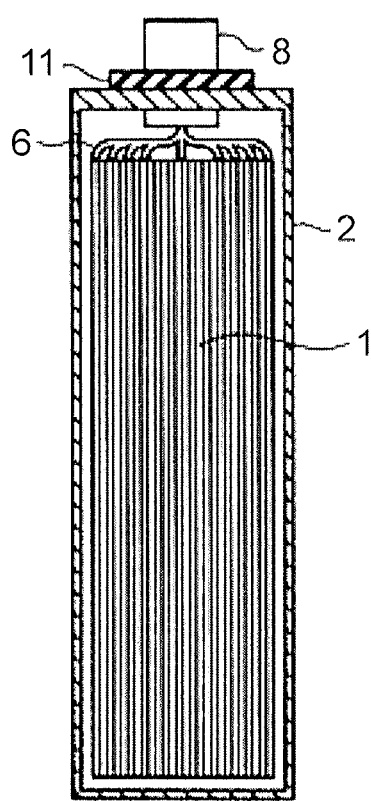
FIG. 3 is a side view of the battery of FIG. 1A.

Hereinafter, embodiments will be described with reference to the drawings. Note that the common configurations throughout the embodiments are denoted by the same signs, and overlapping descriptions will be omitted. Further, each drawing is a schematic diagram for providing explanations and promoting understanding of the embodiments, and the shape, size, ratio, etc. may differ from the actual device, but can be appropriately designed and changed in consideration of the following description and known techniques.

First Embodiment

In order to solve the problem of the non-aqueous secondary battery, studies for making an aqueous solution of electrolyte are underway. In the case of an aqueous solution electrolyte, it is necessary to keep the electric potential range in which a battery is charged and discharged within the electric potential range where electrolysis reaction of water contained as a solvent does not occur. For example, by using lithium manganese oxide as a positive electrode active material and lithium vanadium oxide as a negative electrode active material, electrolysis of a water solvent can be avoided. With these combinations, although an electromotive force of about 1 to 1.5 V can be obtained, it is difficult to obtain an energy density sufficient for a battery.

When lithium manganese oxide is used as a positive electrode active material, and lithium titanium oxide such as $LiTi_2O_4$ or $Li_4Ti_5O_{12}$ is used as a negative electrode active material, theoretically an electromotive force of about 2.6 to 2.7 V can be obtained, which can be an attractive battery also from the viewpoint of energy density. Non-aqueous lithium ion batteries that use such a combination of such negative electrode and positive electrode materials provide excellent life performance, and such batteries have already been put to practical use. However, in the aqueous solution electrolyte, since the lithium insertion/extraction potential of the lithium titanium oxide is about 1.5 V (vs. $Li/Li^+$) on the basis of the lithium potential, electrolysis of the aqueous solution electrolyte is likely to occur. Particularly in a negative electrode, hydrogen is excessively generated by electrolysis on the surface of the negative electrode current collector or the metal case that is electrically connected to a negative electrode, and under the influence, an active material can be easily peeled off from the current collector. Therefore, the operation of such a battery is not stable, and satisfactory charge and discharge are impossible.

As a method of suppressing water decomposition in an electrode, a method of forming a film on an electrode surface may be considered. As a film, a metal film using a metal having a high hydrogen overvoltage may be considered. However, since the metal film is dense, when it is too thick, lithium ion conduction is hindered, and the battery characteristics are degraded. The metal film needs to be a thin film, but it is difficult to form the metal thin film uniformly.

As a result of earnest research to solve this problem, the inventors have invented the secondary battery according to the first embodiment.

A secondary battery according to the first embodiment includes a positive electrode, a negative electrode, and an electrolyte. The negative electrode is provided with a negative electrode current collector provided with a compound including aluminum, and a negative electrode active material including titanium on the negative electrode current collector. The electrolyte contains aqueous electrolyte. A compound containing aluminum is present on at least a part of the granule surface of the negative electrode active material, a ratio of the atomic concentration of the aluminum atoms to the sum of the atomic concentrations of titanium atoms and aluminum atoms on the surface of the negative electrode ({Al atomic concentration/(Al atomic concentration+Ti atomic concentration)}×100) is 3 atm % or more and 30 atm % or less.

The negative electrode includes a current collector and a negative electrode active material layer including a negative electrode active material disposed on the current collector. The negative electrode active material layer contains a negative electrode active material containing a Ti-containing composite oxide. On the surface of this negative electrode, a compound containing aluminum is present. The compound containing aluminum forms at least one of an oxide or a hydroxide, which is deposited on the surface. The compound containing aluminum is present on the surfaces of a negative electrode current collector, and a negative electrode active material, a conductive agent and a binder of the negative electrode, which are exposed on the surface opposite to the current collector of a negative electrode active material layer. The surface of the negative electrode is a generic term for the surfaces of a negative electrode active material, a conductive agent and a binder of negative electrode, which are exposed on the surface opposite to the current collector of the negative electrode active material layer. The compounds containing aluminum are physically present. Physically, single crystals or microcrystals aggregate and exist as a film. The layer of compounds containing aluminum lowers the electrical conductivity of the negative electrode active material. Therefore, hydrogen generation can be suppressed at the negative electrode. The granules of the negative electrode active material are composed of a plurality of first negative electrode active materials and second negative electrode active material located on the outer periphery of the aggregates of the plurality of negative electrode active materials. The details of the electrolyte will be described later.

The compound containing aluminum is, for example, aluminum oxide or aluminum hydroxide. Therefore, a nonmetal film is provided on a surface of the negative electrode provided in the secondary battery according to the present embodiment. This nonmetallic film has a ratio ({Al atomic concentration/(Al atomic concentration+Ti atomic concentration)}×100) defined by the ratio of aluminum atoms to titanium atoms and aluminum atoms on the surface of the negative electrode is 3 atm % or more and 30 atm % or less. If the atomic ratio of aluminum is more than 30 atm %, the amount of compounds containing aluminum present on the surface of the granules of the negative electrode active material becomes excessive, lithium ion conduction is suppressed, and the battery performance is degraded. On the other hand, if the atomic ratio of aluminum is less than 3 atm %, water decomposition cannot be suppressed because the amount of the compound containing aluminum present on the surface of the granules of the negative electrode active material is excessively low, and the battery performance is degraded. The atomic ratio of aluminum is more preferably 10 atm % or more and 21 atm % or less. When the atomic ratio of aluminum on the surface of the negative electrode is 10 atm % or more and 21 atm % or less, water decomposition at the electrode can be suppressed without interfering with lithium ion conduction.

Here, the flow in which the compound containing aluminum is deposited on the surface will be described. A secondary battery in which aluminum is included in a negative electrode current collector is assembled. At this time, a compound containing aluminum is not present on the surface of the active material, the conductive agent, and the like used in the assembled secondary battery. When the active material is coated with a compound containing aluminum, the surface of the active material is further coated after the secondary battery is assembled, and the layer of the compound containing aluminum becomes thick. In this case, the insertion/desorption of carrier ions such as Li ions is likely to occur.

After assembly into a secondary battery, aluminum begins to elute into an electrolyte. The aluminum thus eluted into the electrolyte is deposited on the surface of a negative electrode, for example, as aluminum oxide. The elution of aluminum from the current collector is promoted by, for example, a surfactant. The surfactant improves the affinity of the electrolyte for the current collector, and aluminum is more easily eluted in the electrolyte.

The elution of aluminum into the electrolyte is also promoted by the pH of the electrolyte. When the electrolyte is basic, aluminum is easily eluted from the current collector, and the eluted aluminum is oxidized by oxygen in the electrolyte, whereby the surface of the negative electrode is coated with an oxide or hydroxide. The basicity of the electrolyte may be greater than pH 7. More preferably, the pH is 10 or more.

Thus, by adjusting the concentration of aluminum eluted into the electrolyte, the ratio defined by the ratio of the atoms of aluminum to the atoms of titanium and atoms of aluminum on the surface of the negative electrode ({Al atomic concentration/(Al atomic concentration+Ti atomic concentration)}×100) can be 3 atm % or more and 30 atm % or less.

Since the deposition of the compound containing aluminum on the surface of the negative electrode starts immediately after assembling the secondary battery, the compound containing aluminum can also be present on the surface of the negative electrode of the secondary battery immediately after being assembled.

Furthermore, it can be made to further deposit on the surface of a negative electrode by providing a waiting time after assembling. This waiting time may be about twenty four hours.

It is also possible to cause a compound containing aluminum to be present further on the surface of the negative electrode by oxidation during charge and discharge cycles after assembly.

Thus, by placing a compound containing aluminum on the surface of the negative electrode after assembling the secondary battery, where in contact with the electrolyte of the active material, a compound containing aluminum is present, and where the active materials are in contact with each other, no compound containing aluminum is present. Since the compound containing aluminum is an insulator, when the compound containing aluminum is present between the active materials, the contact between the active materials is prevented, and the Li ion conductivity is lowered. Therefore, as in the secondary battery according to the present embodiment, by making a compound containing aluminum to exist in a portion where the negative electrode active materials are not in contact with each other, water decomposition can be suppressed without inhibiting the battery reaction such as insertion/desorption of Li ions in the active material.

In the secondary battery according to the present embodiment, by containing aluminum, a compound containing aluminum can be present on the surface of the negative electrode, and peeling of the negative electrode active material from the negative electrode current collector can be suppressed. FIG. 1A is a schematic cross-sectional view of an electrode provided in a secondary battery according to the present embodiment. FIG. 1B is a schematic cross-sectional view of an electrode provided in a conventional secondary battery. Comparing FIGS. 1A and 1B, as illustrated in FIG. 1A, the active material granule 101 (granulated body) is composed of the first active material 1011 and the second active material 1012, and the first active material 1011 and the second active material 1012 can directly contact. In other words, a portion of the active material granules 101 in contact with the electrolyte can be covered with the compound 100 containing aluminum, that is, the active materials 101 can be directly connected to each other. Therefore, resistance caused by the presence of a compound containing aluminum between active materials can be suppressed. Therefore, even in the vicinity of 1.5 V (vs. Li/Li$^+$) on the basis of lithium potential, charging and discharging to titanium oxide, lithium titanium oxide, and lithium titanium composite oxide in an aqueous solvent can be performed. "103" indicates a current collector. Aluminum can be contained in the electrolyte and the negative electrode in addition to the current collector in the secondary battery. On the other hand, in FIG. 1B, since the compound 100 containing aluminum is present between the first active material 1011 and the second active material 1012, the Li ion conductivity is lowered.

Here, the measuring method of an elemental ratio of aluminum will be described.

First, the secondary battery is dissembled. For example, the secondary battery is disassembled, and the negative electrode is extracted. The extracted negative electrode is washed with pure water and then dried overnight in the atmospheric environment.

In the negative electrode thus extracted, measurement of energy dispersive X-ray spectrometry (EDS) is performed. Five places are randomly selected with respect to the negative electrode and are measured at a magnification of 200 times to derive an atomic ratio of aluminum ({Al atomic concentration/(Al atomic concentration+Ti atomic concentration)}×100). A measurement field of view of EDS is larger than a negative electrode active material. The number of characteristic X-rays generated in the EDS analysis is proportional to the concentration of atoms. The concentration of contained atoms can be determined by examining the intensity (count number) of each characteristic X-ray. In this way, the atomic concentration of aluminum and the atomic concentration of titanium at the surface of the negative electrode are determined at five locations to calculate the average of a ratio ({Al atomic concentration/(Al atomic concentration+Ti atomic concentration)}×100) of the atomic concentration of aluminum to the sum of the atomic concentrations of titanium atoms and aluminum atoms at the five locations. Consequently, the atomic ratio of aluminum at the negative electrode is derived.

Since the larger the atomic ratio of aluminum is, the more aluminum is present on the surface of the negative electrode, it can be replaced that the large amount of the compound containing aluminum exists the surface of the negative electrode.

Although the presence of the compound containing aluminum on the surface of the negative electrode has been described so far, the compound containing aluminum can also be present on the negative electrode current collector. Details will be described later.

The material of each member that can be used in the secondary battery according to the first embodiment will be described in detail.

1) Negative Electrode

The negative electrode includes a negative electrode current collector and a negative electrode active material layer disposed on the negative electrode current collector. The negative electrode active material layer is disposed on at least one surface of the negative electrode current collector. For example, the negative electrode active material layer may be disposed on one surface of the negative electrode current collector, or the negative electrode active material layer may be disposed on one surface of the negative electrode current collector and the back surface thereof.

The negative electrode active material layer includes a negative electrode active material containing at least one compound selected from the group consisting of titanium oxide, lithium titanium oxide, and lithium titanium composite oxide. These oxides can be used alone or in combination of two or more. In these oxides, Li insertion/desorption reaction occurs in the range of 1V or more and 2 V or less (vs. Li/Li$^+$) on the basis of lithium potential. Therefore, when these oxides are used as the negative electrode active material of the secondary battery, long life can be realized because the change in volumetric expansion and contraction due to charge and discharge is small.

Aluminum can be used for the negative electrode current collector. In addition to aluminum, at least one element selected from a group elements A consisting of Ga, In, Bi, Tl, Sn, Pb, and Ti may be further contained in the current collector. These elements can also be used in one kind of element or may be used in plural kinds of elements, and can be included in the form of metals or metal alloys. Such metals and metal alloys may be contained singly or in combination of two or more. When the element A is contained in the current collector, the mechanical strength of the current collector is enhanced, and the processing performance is improved. Furthermore, the effect of suppressing the electrolysis of the aqueous solvent and suppressing hydrogen generation is increased. Among the above elements, Pb and Ti are more preferable.

The current collector is, for example, a metal foil made of aluminum. The current collector is, for example, a foil made of an alloy containing aluminum. Such a foil may contain, in addition to aluminum, one or more elements other than the element A. The shape of the metal body may be, for example, a mesh or a porous body other than the foil. In order to improve energy density and output, it is desirable to use a foil shape having a small volume and a large surface area.

In addition, the negative electrode current collector can include a substrate containing a metal different from aluminum. In such a case, the generation of hydrogen can be suppressed by the presence of a compound containing aluminum in at least a part of the surface of the substrate. It is desirable that the compound containing aluminum present on the surface be disposed in contact with the negative electrode active material layer. For example, the substrate can be plated with aluminum to allow the presence of aluminum on the surface of the substrate. Alternatively, the surface of the substrate can be plated with an alloy containing aluminum. In addition to aluminum, the element A described above may be present on or in the substrate.

A current collector may contain at least one compound selected from the group consisting of the element A. It is preferable that the element A oxide, the element A hydroxide, the basic carbonate element A compound, and/or the element A sulfate compound be included in at least a part of the surface region of the current collector in a depth region from 5 nm or more to 1 µm or less from the surface in the depth direction.

When at least one of any of the element A oxide, the element A hydroxide, the element A basic carbonate compound, and the sulfate compound of element A exists in the surface layer portion of a current collector, hydrogen generation can be suppressed. In addition, when these compounds are present in a surface layer portion of the current collector, the adhesion between the current collector and an active material is improved, and the number of paths for electron conduction can be increased, thereby cycle characteristics can be increased, and resistance can be reduced. Furthermore, hydrogen generation on the current collector can also be suppressed.

The substrate preferably contains at least one metal selected from Al, Fe, Cu, Ni, and Ti. These metals can also be included as alloys. In addition, the substrate may contain such metals and metal alloys alone, or may contain two or more in combination. From the viewpoint of weight reduction, the substrate preferably contains Al, Ti, or an alloy thereof.

Whether the current collector contains at least one compound selected from the element A can be examined by decomposing the battery as described above and then performing, for example, energy dispersive X-ray spectroscopy (SEM-EDX) or X-ray photoelectron spectroscopy (XPS).

The negative electrode active material includes one or two or more compounds selected from the group consisting of titanium oxide, lithium titanium oxide, and lithium titanium composite oxide. Examples of lithium titanium composite oxides include niobium titanium oxide and sodium niobium titanium oxide. The Li storage potential of these compounds is preferably in the range of 1 V (vs. Li/Li$^+$) or more and 3 V (vs. Li/Li$^+$) or less.

Examples of titanium oxides include titanium oxides having a monoclinic structure, titanium oxides having a rutile structure, and titanium oxides having an anatase structure. The titanium oxide of each crystal structure can be represented by the composition before charging being $TiO_2$, and the composition after charging being $Li_xTiO_2$ (x is 0≤x). In addition, the pre-charge structure of titanium oxide having a monoclinic structure can be represented as $TiO_2$ (B).

Examples of lithium titanium oxides include spinel-type lithium titanium oxides (for example, general formula $Li_{4+x}Ti_5O_{12}$ (x is −1≤x≤3)), and lithium titanium oxides having a ramsdellite structure (for example, $Li_{2+x}Ti_3O_7(-1≤x≤3)$), $Li_{1+x}Ti_2O_4(0≤x≤1)$, $Li_{1.1+x}Ti_{1.8}O_4$ (0≤x≤1) $Li_{1.07+x}Ti_{1.86}O_4$ (0≤x≤1), $Li_xTiO_2$ (0<x), and the like are included.

Examples of niobium titanium oxide include $Li_aTiM_bNb_{2±β}O_{7±σ}$ (0≤a≤5, 0≤b≤0.3, 0≤β0.3, 0≤σ≤0.3, and M is at least one element selected from a group consisting of Fe, V, Mo, and Ta).

Examples of sodium niobium titanium oxides include orthorhombic Na-containing niobium titanium composite oxides represented by the general formula $Li_{2+v}Na_{2-w}M1_xTi_{6-y-z}Nb_yM2_zO_{14+δ}$ (0≤v≤4, 0<w<2, 0≤x<2, 0<y<6, 0≤z<3, y+z<6, −0.5≤δ<0.5, M1 contains at least one selected from Cs, K, Sr, Ba, and Ca, and M2 contains at least one selected from Zr, Sn, V, Ta, Mo, W, Fe, Co, Mn, and Al).

Examples of preferable compounds as the negative electrode active material include titanium oxides having anatase structure, titanium oxides having a monoclinic structure, and lithium titanium oxides having a spinel structure. Since each compound has a Li storage potential in a range of 1.4 V (vs. Li/Li$^+$) or more and 2 V (vs. Li/Li$^+$) or less, for example, a high electromotive force can be obtained by combining with, for example, lithium manganese oxide as a positive electrode active material. Among these, lithium titanium oxide having a spinel structure is more preferable because the volume change due to charge and discharge reaction is extremely small.

The negative electrode active material may be contained in the form of particles in the negative electrode active material layer. The negative electrode active material particles can be single primary particle, secondary particles that are aggregates of primary particles, or mixture of single primary and secondary particles. The shape of the particles is not particularly limited, and can be, for example, spherical, elliptical, flat, fibrous, or the like.

The average particle size (diameter) of the secondary particles of the negative electrode active material is preferably 3 µm or more. More preferably, it is 5 µm or more and 20 µm or less. Since the surface area of an active material is small when the diameter is within this range, the effect of suppressing hydrogen generation can be enhanced.

The negative electrode active material in which the average particle diameter of secondary particles is 3 µm or more can be obtained, for example, by the following method. First, the active material is reacted and synthesized, and an active material precursor having an average particle size of 1 µm or less is produced. Thereafter, the active material precursor is subjected to a baking treatment, and a grinding process is performed using a grinder such as a ball mill or jet mill. Next, in the baking treatment, the active material precursor is aggregated to grow into secondary particles having a large particle size.

The average particle diameter of primary particles of the negative electrode active material is desirably 1 µm or less. As a result, the diffusion distance of Li ions in the active material becomes short, and the specific surface area is increased. Therefore, excellent high input performance (rapid charge performance) can be obtained. On the other hand, when the average particle size is small, particle aggregation is likely to occur, and the distribution of electrolytes may be biased to a negative electrode to cause depletion of the electrolytes at a positive electrode. Therefore, the lower limit is preferably 0.001 µm. A further preferable average particle size is 0.1 µm or more and 0.8 µm or less. Granules are generated when a negative electrode active material, a conductive agent and a binder are kneaded and mixed, that is, when a slurry for preparing a negative electrode is prepared.

The negative electrode active material particles preferably have a specific surface area of 3 m²/g or more and 200 m²/g or less as measured by a BET method using $N_2$ precipitation. Thereby, the affinity between the negative electrode and the electrolyte can be further enhanced.

The specific surface area of the negative electrode active material layer (excluding a current collector) is preferably in the range of 3 m²/g to 50 m²/g. A more preferable range of the specific surface area is 5 m²/g or more and 50 m²/g or less. The negative electrode active material layer may be a porous layer including a negative electrode active material, a conductive agent and a binder, supported on a current collector.

The porosity of the negative electrode (excluding a current collector) is preferably in the range of 20 to 50%. This makes it possible to obtain a high density negative electrode that is excellent in affinity between the negative electrode and the electrolyte. A further preferable range of the porosity is 25 to 40%.

Examples of the conductive agent include carbon materials such as acetylene black, carbon black, coke, carbon fibers and graphite, and metal powders such as nickel and zinc. The type of the conductive agent can be one or two or more. Since carbon materials generate hydrogen from themselves, metal powder may be used as the conductive agent.

Examples of a binder include polytetrafluoroethylene (PTFE), polyvinylidene fluoride (PVdF), fluorocarbon rubber, ethylene-butadiene rubber, polypropylene (PP), polyethylene (PE), carboxymethylcellulose (CMC), polyimide (PI), polyacrylimide (PAI), and the like. The type of the binder may be one or two or more.

As for the compounding ratio of the negative electrode active material, the conductive agent and the binder in the negative electrode active material layer, the negative electrode active material is preferably in the range of 70 wt % or more and 95 wt % or less, the conductive agent is preferably in the range of 3 wt % or more and 20 wt % or less, and the binder is preferably in the range of 2 wt % or more and 10 wt % or less. If the compounding ratio of the conductive agent is 3 wt % or more, the conductivity of the negative electrode can be improved, and if it is 20 wt % or less, the decomposition of the electrolyte on the surface of the conductive agent can be reduced. If the blending ratio of the binder is 2 wt % or more, sufficient electrode strength can be obtained, and if the blending ratio of the binder is 10 wt % or less, the insulating portion of the electrode can be reduced. Even with a conductive agent, water decomposition can occur, and therefore it is preferable that aluminum is also present on the conductive agent.

The negative electrode can be produced, for example, as follows. First, a negative electrode active material, a conductive agent and a binder are dispersed in an appropriate solvent to prepare a slurry. The slurry is applied to a current collector, and the coated film is dried to form a negative electrode active material layer on the current collector. Here, for example, the slurry may be applied to one side of the current collector, or the slurry may be applied to one side of the current collector and its back side. Next, the negative electrode can be produced, for example, by applying a press such as a heating press against the current collector and the negative electrode active material layer.

2) Positive Electrode

The positive electrode can have a positive electrode current collector, and a positive electrode layer supported on one side or both sides of the positive electrode current collector and containing an active material, a conductive agent, and a binder.

As the positive electrode current collector, it is preferable to use a foil, a porous body, or a mesh made of a metal such as stainless steel, Al, or Ti. To prevent corrosion of the current collector due to the reaction between the current collector and an electrolyte, the surface of the current collector may be coated with different elements.

As the positive electrode active material, those capable of inserting and extracting lithium and sodium can be used. The positive electrode may include one type of positive electrode active material, or may include two or more types of positive electrode active material. Examples of the positive electrode active material include lithium manganese complex oxide, lithium nickel composite oxide, lithium cobalt aluminum complex oxide, lithium nickel cobalt manganese complex oxide, spinel type lithium manganese nickel composite oxide, lithium manganese cobalt complex oxide, lithium iron oxide, lithium fluorinated iron sulfate, and phosphoric acid compound having an olivine crystal structure (for example, $Li_xFePO_4$ (0≤x≤1), $Li_xMnPO_4$ (0≤x≤1)). The phosphoric acid compounds having an olivine crystal structure are excellent in thermal stability.

Examples of the positive electrode active material from which a high positive electrode potential can be obtained is described below. The examples include $Li_xMn_2O_4$ (0<x≤1) having a spinel structure, lithium manganese complex oxide such as $Li_xMnO_2$ (0<x≤1), lithium nickel aluminum complex oxide such as $Li_xNi_{1-y}Al_yO_2$(0<x≤1, 0<y≤1), lithium cobalt composite oxide such as $Li_xCoO_2$ (0≤x≤1), lithium nickel cobalt composite oxides such as $Li_xNi_{1-y-z}Co_yMn_zO_2$ (0<x≤1, 0<y≤1, 0≤z≤1), lithium manganese cobalt complex oxide such as $Li_xMn_yCo_{1-y}O_2$ (0<x≤1, 0<y≤1), spinel-type lithium manganese nickel composite oxide such as $Li_xMn_{2-y}Ni_yO_4$(0<x≤1, 0<y<2), lithium phosphorus oxide having an olivine structure such as $Li_xFePO_4$ (0<x≤1), $Li_xFe_{1-y}Mn_yPO_4$ (0<x≤1, 0≤y≤1), $Li_xCoPO_4$ (0<x≤1), and fluorinated iron sulfate (for example, $Li_xFeSO_4F$ (0<x≤1)).

In addition, the examples include sodium manganese complex oxide, sodium nickel complex oxide, sodium cobalt complex oxide, sodium nickel cobalt manganese complex oxide, sodium iron complex oxide, sodium phosphorous oxide (for example, sodium phosphate iron, sodium vanadium phosphate), sodium-iron-manganese composite oxide, sodium-nickel-titanium composite oxide, sodium-nickel-iron composite oxide, sodium-nickel-manganese composite oxide, and the like.

Examples of preferable positive electrode active materials include iron complex oxide (for example, $Na_yFeO_2$, 0≤y≤1), iron manganese complex oxide (for example, $Na_yFe_{1-x}Mn_xO_2$, 0<x<1, 0≤y≤1), nickel titanium complex oxide (for example, $Na_yNi_{1-x}Ti_xO_2$, 0<x<1, 0≤y≤1), nickel-iron complex oxide (for example, $Na_yNi_{1-x}Fe_xO_2$, 0<x<1, 0≤y≤1), nickel-manganese complex oxide (for example, $Na_yNi_{1-x}Mn_xO_2$, 0<x<1, 0≤y≤1), nickel-manganese-iron complex oxide (for example, $Na_yNi_{1-x-z}Mn_xFe_zO_2$, 0<x<1, 0≤y≤1, 0<z<1, 0<1-x-z<1), and iron phosphate (for example, $Na_yFePO_4$, 0≤y≤1).

The particles of the positive electrode active material may include a single primary particle, a secondary particle which is an aggregate of primary particles, or both a single primary particle and a secondary particle. The average particle size (diameter) of primary particles of the positive electrode active material is preferably 10 μm or less, and more preferably 0.1 μm to 5 μm. The average particle diameter of the secondary particles of the positive electrode active material is preferably 100 μm or less, and more preferably 10 μm to 50 μm.

At least a part of the particle surface of the positive electrode active material may be coated with a carbon material. The carbon material can take a form of a layer structure, a particle structure, or an aggregate of particles.

Examples of a conductive agent for enhancing the electron conductivity of the positive electrode layer and suppressing the contact resistance with a current collector include acetylene black, carbon black, graphite, carbon fibers having an average fiber diameter of 1 μm or less, and the like. The type of the conductive agent can be one or two or more.

Examples of the binder for binding the active material and the conductive agent include polytetrafluoroethylene (PTFE), polyvinylidene fluoride (PVdF), fluorine-based rubber, ethylene-butadiene rubber (SBR), polypropylene (PP), polyethylene (PE), carboxymethylcellulose (CMC), polyimide (PI), and polyacrylimide (PAI). The type of the binder can be one or two or more.

As for the compounding ratio of the positive electrode active material, the conductive agent and the binder in the positive electrode layer, preferably, the positive electrode active material is 70 wt % or more and 95 wt % or less, the conductive agent is 3 wt % or more and 20 wt % or less, and the binder is 2 wt % or more and 10 wt % or less. If the compounding ratio of the conductive agent is 3 wt % or more, the conductivity of the positive electrode can be improved, and if it is 20 wt % or less, the decomposition of the electrolyte on the surface of the conductive agent can be reduced. If the blending ratio of the binder is 2 wt % or more, sufficient electrode strength can be obtained, and if the blending ratio of the binder is 10 wt % or less, the insulating portion of the electrode can be reduced.

The positive electrode can be produced, for example, as follows. First, a positive electrode active material, a conductive agent and a binder are dispersed in an appropriate solvent to prepare a slurry. The slurry is applied to a current collector, and the coated film is dried to form a positive electrode layer on the current collector. Here, for example, the slurry may be applied to one side of the current collector, or the slurry may be applied to one side of the current collector and its back side. Next, the positive electrode can be produced, for example, by applying a press such as a heating press against the current collector and the positive electrode layer.

3) Aqueous Electrolyte

The aqueous electrolyte includes a liquid aqueous electrolyte containing an aqueous solvent and a first electrolyte, and a gel electrolyte in which a polymer material is complexed to the liquid aqueous electrolyte. The aqueous electrolyte may include a first compound.

The first compound has a hydrophobic portion and a hydrophilic portion in a molecule, and can be adsorbed to the electrode surface (the electrode active material surface) at the hydrophobic portion, for example. In a secondary battery using a negative electrode containing a titanium-containing oxide, the interaction between the titanium-containing oxide and the first compound is not excessively strong, and an excessive film is not formed. The water molecule is constrained by the interaction between the hydrophilic portion and the water molecule in the first compound. Therefore, the approach of the water molecule to the surface of the electrode active material (for example, a titanium-containing oxide) is inhibited, and the suppression of the electrolysis of water is promoted.

It is more preferable to use a nonionic surfactant as the first compound. Nonionic surfactants interact with water molecules by hydrogen bonding. Therefore, nonionic surfactants can better block the access of water molecules to the electrode active material. As the first compound, for example, $C_{12}H_{25}$—O—$(CH_2CH(CH_3)O)_y$—$(CH_2CH_2O)_xH$, $C_4H_9O$—$(CH_2CH_2O)_x$—$[CH_2CH(CH_3)O]_yH$, OH—$(CH_2CH_2O)_z$—$(CH_2CH(CH_3)O)_y$—$(CH_2CH_2O)_xH$, and the like can be used.

One type of the compound may be used alone as the first compound. Alternatively, two or more compounds may be used as the first compound. Even when one type of compound is used alone as the first compound, the above-described effect can be exhibited.

The first compound may contain an alcohol which is a raw material of the first compound, or a polyether polyol which is a by-product.

The interfacial tension can be changed by adding the first compound to the aqueous electrolyte. For example, the addition of the first compound can reduce the interfacial tension of the aqueous electrolyte. Depending on the type of the first compound, the degree of change in interfacial tension varies.

Even if the type of surfactant in the aqueous electrolyte is changed or the amount added is increased, it is difficult to lower the interfacial tension of the aqueous electrolyte to less than about 20 mN/m. Therefore, by setting the interfacial tension of the aqueous electrolyte to 20 mN/m or more, it is not necessary to excessively use the first compound.

Further, the interfacial tension of the aqueous electrolyte is preferably 48 mN/m or less. When the particle size is 48 mN/m or less, the affinity between an electrode and an aqueous electrolyte is improved, and in and out of lithium ion at the electrode is promoted. If the interfacial tension exceeds 48 mN/m, it is not preferable since the interfacial tension is excessively increased, the affinity between the electrode and the aqueous electrolyte is reduced, and in and out of lithium ions are not allowed at the electrode. The interfacial tension of the aqueous electrolyte is more preferably 25 mN/m or more and 30 mN/m or less. When the interaction between the aqueous electrolyte and the electrode is excessively large, the water decomposition reaction at the electrode is promoted. This is because when the interfacial tension is 25 mN/m or more and 30 mN/m or less, the affinity between the electrode and the aqueous electrolyte is improved, but water decomposition at the electrode can be prevented.

In the measurement, a hole is made in the outer shell of a battery, for example, the bottom of a cylindrical battery, and then the battery is stored in a collection container. The collection container and the battery are introduced into a high-speed centrifuge, and centrifugal force extracts liquid aqueous electrolyte from the inside of a battery into the collection container. The interfacial tension of the aqueous electrolyte can be determined, for example, using a hanging drop method. As the measuring device, for example, an automatic contact angle meter Dme-201 manufactured by Kyowa Interface Science Co., Ltd. can be used.

The interfacial tension of the aqueous electrolyte is calculated from the following equation (1) using the hanging drop method to calculate the interfacial tension.

$$\text{Interfacial tension } (mN/M) = \Delta\rho g d e^2 (1/H) \quad (1)$$

Each symbol in Equation (1) is as follows: $\Delta\rho$: density difference, g: gravitational acceleration, de: maximum diameter of hanging drop, and 1/H: correction coefficient. For example, the measurement is performed five times, and the average value is regarded as the interfacial tension.

Whether or not the first compound contains a hydrophilic part and a hydrophobic part can be confirmed by measuring a proton nuclear magnetic resonance ($^1$H NMR) spectrum of the aqueous electrolyte. As a sample to be subjected to $^1$H NMR spectrum measurement, for example, a liquid aqueous electrolyte extracted from a battery can be used as it is. The aqueous electrolyte is dissolved in deuterated chloroform (CDCl$_3$) and $^1$H NMR spectrum is measured. In the spectrum obtained, a peak attributable to methyl and methylene groups derived from hydrophobic groups is observed at 0.8 to 1.4 ppm, and ethylene oxide is observed at 3 to 4 ppm.

When the molecular weight of the first compound is measured, it can be measured by MALDI-TOF-MS (Matrix Assisted Laser Desorption/Ionization Time-of-Flight Mass Spectrometry) analysis. As the apparatus, for example, JMS-S3000 Spiral TOF manufactured by JEOL Ltd. (JEOL) can be used. For data analysis, for example, MS Tornado Analysis manufactured by JEOL Ltd. can be used. Polymethyl methacrylate (molecular weight standard for size exclusion chromatography) is used as the external standard of mass composition.

As the aqueous solvent, a solution containing water can be used. Here, the solution containing water may be pure water, or a mixed solution or mixed solvent of water and a substance other than water.

In the above aqueous electrolyte, preferably, the amount of water solvent (for example, the amount of water in the aqueous solvent) is 1 mol or more per 1 mol of salt serving as a solute. In a further preferable embodiment, the amount of water solvent is 3.5 mol or more per 1 mol of salt serving as a solute.

As the first electrolyte, an electrolyte that dissociates when dissolved in an aqueous solvent to generate the above anion can be used. In particular, a lithium salt that dissociates into Li ions and the above anions is preferable. Specifically, the first electrolyte contains at least one anion selected from the group consisting of $NO_3-$, $Cl-$, $LiSO_4-$, $SO_{42}-$, and $OH-$. These anions contained in the water system may be one type. Alternatively, two or more types of anions may be contained. Examples of such a lithium salt include LiNO$_3$, LiCl, Li$_2$SO$_4$, LiOH and the like.

Note that, for convenience, the electrolyte as the solute are referred to as the first electrolyte to distinguish from an aqueous electrolyte used to collectively refer to a liquid aqueous electrolyte and a gel electrolyte.

In addition, lithium salt that dissociate into Li ions and the anions have relatively high solubility in aqueous solvents. For this reason, an aqueous electrolyte that have a high anion concentration of 1 to 10 M and that is excellent in Li ion diffusivity can be obtained.

Aqueous electrolytes containing $NO_3-$ and/or $Cl-$ can be used in a wide range of anion concentration of about 0.1 to 10 M. It is preferable that the concentration of these anions is as high as 3 to 12 M from the viewpoint of achieving both the ion conductivity and the lithium equilibrium potential. More preferably, the anion concentration of the aqueous electrolyte containing $NO_3-$ or $Cl-$ is 8 to 12 M.

Aqueous electrolytes containing $LiSO_4-$ and/or $SO_4^{2-}$ can be used in the range of an anion concentration of about 0.05 to 2.5 M. From the viewpoint of ion conductivity, the concentration of these anions is preferably as high as 1.5 to 2.5 M.

The OH$-$ concentration in the aqueous electrolyte is preferably $10^{-10}$ to 0.1 M. Further, the aqueous electrolyte can include both lithium ion and sodium ion.

The pH of the aqueous electrolyte is preferably 4 or more and 13 or less. If the pH is less than 4, decomposition of the active material is likely to proceed because the aqueous electrolyte is acidic. When the pH exceeds 13, since the oxygen generation overvoltage at the positive electrode is reduced, the electrolysis of the aqueous solvent is likely to proceed.

The solute in the aqueous electrolyte, that is, the first electrolyte, can be characterized and quantified, for example, by ion chromatography. Ion chromatography is particularly preferred as an analytical method because of its high sensitivity.

Examples of specific measurement conditions for qualitative and quantitative analysis of the solute contained in the aqueous electrolyte by ion chromatography are indicated below:

System: Prominence HIC-SP
Analysis column: Shim-pack IC-SA3
Guard column: Shim-pack IC-SA3 (G)
Eluent: 3.6 mmol/L sodium carbonate aqueous solution
Flow rate: 0.8 mL/min
Column temperature: 45° C.
Injection amount: 50 μL
Detection: Electrical conductivity The presence of water in the aqueous electrolyte can be confirmed by gas chromatography-mass spectrometry (GC-MS) measurement. Further, the calculation of the water content in the aqueous electrolyte can be measured by, for example, emission analysis of ICP. Further, the number of moles of the solvent can be calculated by measuring the specific gravity of the aqueous electrolyte. The same aqueous electrolyte may be used on the positive electrode side and the negative electrode side, or different electrolytes may be used. In this case, the pH of the aqueous electrolyte of the positive electrode is preferably 1 or more and 7 or less. If the pH of the aqueous electrolyte of the positive electrode is 8 or more, the oxygen generation reaction caused by the electrolysis of water advantageously proceeds, and if it is less than 1, decomposition of the active material proceeds, which is not preferable. The aqueous electrolyte of the negative electrode is preferably greater than pH 7. When it is pH 7 or less, the hydrogen generation reaction resulting from the electrolysis of water advantageously proceeds, which is not preferable.

Examples of the above-described polymer material include polyvinylidene fluoride (PVdF), polyacrylonitrile (PAN), polyethylene oxide (PEO) and the like.

Additives can also be added to the aqueous electrolyte. For example, a surfactant or a metal containing the element A described above can be added. Examples of surfactants include nonionic surfactants such as polyoxyalkylene alkyl ether, polyethylene glycol, polyvinyl alcohol, thiourea, 3.3'-dithiobis (1-propanephosphinic acid) disodium, dimercaptothiadiazole, boric acid, oxalic acid, malonic acid, saccharin, naphthalene sodium sulfonate, gelatin, potassium nitrate, aromatic aldehyde, heterocyclic aldehyde, and the like. The surfactants may be used alone or in combination of two or more.

As an additive, any one of aluminum, zirconia, and titanium may be included in the aqueous electrolyte or negative electrode active material layer. It is considered that this makes it possible to obtain the same effects as described above, that is, a film including an additive metal is formed in a portion of the active material not in contact with another active material, and as a result, water decomposition is suppressed. The form of a metal to be added may be a single metal, or may be any one of oxides, chlorides, sulfides, nitrates, sulfates and hydroxide salts, or two or more may be combined. Further, the additive metal can be present in the aqueous electrolyte either as an ion or as a solid. When being included in the negative electrode active material layer, the additive metal may be added during preparation of a slurry. When the additive metal is added in the aqueous electrolyte, when the concentration of the metal contained in the aqueous electrolyte becomes excessive, the deposition of metal ions from the current collector is suppressed, and active material coating is suppressed in the negative electrode, and the effect of water decomposition may be lowered. Since it takes time until metal ions in the aqueous electrolyte reach in the negative electrode, metal compound coating in the negative electrode is assumed to be formed by metal ions eluted from the current collector. However, when excessive metal ions are present in the aqueous electrolyte in advance, it is considered that, from the relationship of the solubility, the elution of metal ions from the current collector can be suppressed. When the elution is suppressed, it becomes difficult to coat with compounds including aluminum on a surface of the active material, which is not preferable. Further, the pH of the aqueous electrolyte should not fluctuate significantly by adding a metal. For example, the pH of aluminum chloride moves on the acid side by hydrolysis. As the aqueous electrolyte of the negative electrode moves on the acid side, water decomposition advantageously proceeds against negative electrode reaction, which is not preferable.

Whether or not the surfactant is contained in the aqueous electrolyte can be examined using the above-described GC-MS. For example, the aqueous electrolyte is extracted with hexane, and the organic solvent in the aqueous electrolyte is removed. The removed organic solvent can be identified by performing GC-MS and nuclear magnetic resonance measurement (NMR). Further, the additive metal can be examined by ICP.

The aqueous electrolyte may include an organic solvent.

4) Separator

A separator can be disposed between a positive electrode and a negative electrode. By forming the separator with an insulating material, electrical contact between the positive electrode and the negative electrode can be prevented. Further, it is desirable to use a separator with a shape that allows an electrolyte to move between the positive electrode and the negative electrode. Examples of the separator include non-woven fabric, film, paper, and the like. Examples of the constituent material of the separator include polyolefins such as polyethylene and polypropylene, and cellulose. Examples of preferred separators include non-woven fabrics containing cellulose fibers and porous films containing polyolefin fibers. The porosity of the separator is preferably 60% or more. The fiber diameter is preferably 10 µm or less. By setting the fiber diameter to 10 µm or less, the affinity of the separator to the electrolyte is improved, such that the battery resistance can be reduced. A more preferable range of the fiber diameter is 3 µm or less. The cellulose fiber-containing non-woven fabric having a porosity of 60% or more has excellent electrolyte impregnation, and can provide high output performance from low temperature to high temperature. In addition, it does not react with the negative electrode even in long-term charge storage, float charge, and overcharge, and short circuit between the negative electrode and the positive electrode does not occur due to dendrite deposition of lithium metal. A more preferable range is 62% to 80%.

Furthermore, a solid electrolyte can also be used as a separator. As a solid electrolyte, it is preferable to use a lithium phosphoric acid solid electrolyte having a NASICON type structure and represented by the general formula $LiM_2(PO_4)_3$. M in the above-described general formula is preferably at least one element selected from the group consisting of titanium (Ti), germanium (Ge), strontium (Sr), zirconium (Zr), tin (Sn), and aluminum (Al). More preferably, the element M contains any one element of Ge, Zr and Ti, and Al. A specific example of a lithium phosphoric acid solid electrolyte having a NASICON type framework include LATP ($Li_{1+x}Al_xTi_{2-x}(PO_4)_3$; $0.1 \leq x \leq 0.4$). Oxides such as amorphous LIPON ($Li_{2.9}PO_{3.3}N_{0.46}$) and garnet type LLZ ($Li_7La_3Zr_2O_{12}$) are preferable.

Further, β-alumina, $Na_{1+x}Zr_2Si_xP_{3-x}O_{12}$ ($0 \leq x \leq 3$), $NaAlSi_3O_8$, and the like can also be used.

A separator preferably has a thickness of 20 µm or more and 100 µm or less, and a density of 0.2 g/cm³ or more 0.9 g/cm³ or less. Within this range, mechanical strength and reduction of battery resistance can be balanced, and a secondary battery with high output and suppressed internal short circuit can be provided. In addition, the thermal shrinkage of the separator in a high temperature environment is small, and excellent high temperature storage performance can be obtained.

The separator may include a porous free standing film, a solid electrolyte layer, and a first binder. The separator has a two-layer structure of a porous free standing film and a solid electrolyte layer provided on one main surface of the porous free standing film. The laminate of the porous self-supporting film and the solid electrolyte layer is bound and integrated by the binder of the same material as the binder contained in the solid electrolyte layer. The solid electrolyte layer contains a solid electrolyte.

The film thickness of the separator containing the porous free standing film, the solid electrolyte layer, and the first binder is preferably 100 µm or less, and more preferably 70 µm or less. Since this separator has a two-layer structure of a porous self-supporting film and a solid electrolyte layer, it is possible to achieve both water shielding and sufficient strength even if the film thickness is reduced. The thickness of the separator is preferably 50 µm or more from the viewpoint of enhancing the mechanical strength. The separator is preferably flexible.

The solid electrolyte layer of the separator may include a second binder. The first binder and the second binder are polymer materials. The polymeric material may be a polymer consisting of a single monomer unit (polymer), a copolymer consisting of a plurality of monomer units (copolymer), or a mixture of these. The polymer material preferably include a monomer unit composed of hydrocarbon having a functional group containing one or two or more elements selected from the group consisting of oxygen (O), sulfur (S), nitrogen (N), and fluorine (F). In the polymer material, the proportion of the portion composed of the monomer units is preferably 70 mol % or more.

The porous free standing membrane is, for example, a porous film or a non-woven fabric. As a material of a porous film or a non-woven fabric, for example, polyethylene (PE), polypropylene (PP), cellulose, or polyvinylidene fluoride (PVdF) can be used. The porous film is preferably a non-woven fabric made of cellulose. For example, it is 3 µm or more and 50 µm or less, preferably 5 µm or more and 30 µm or less.

The solid electrolyte layer can transmit monovalent cations. Examples of monovalent cations include alkali metal ions such as lithium ion and sodium ion. The film thickness of the solid electrolyte layer is, for example, 3 µm or more and 90 µm or less, and preferably 5 µm or more and 70 µm or less.

5) Container

A container made of a metal, a container made of a laminate film, or a container made of resin such as polyethylene or polypropylene can be used as a container in which a positive electrode, a negative electrode, and an electrolyte are housed.

As the metal container, a metal made of nickel, iron, stainless steel, zinc or the like and having a rectangular or cylindrical shape can be used.

The thickness of each of the resin container and the metal container is preferably 1 mm or less, and more preferably 0.5 mm or less. A further preferred range is 0.3 mm or less. Furthermore, the lower limit of board thickness is desirably 0.05 mm.

Examples of a laminate film include a multilayer film and the like, which cover a metal layer with a resin layer. Examples of metal layers include stainless steel foil, aluminum foil, and aluminum alloy foil. For the resin layer, polymers such as polypropylene (PP), polyethylene (PE), nylon, and polyethylene terephthalate (PET) can be used. The preferred range of the thickness of the laminate film is 0.5 mm or less. A more preferable range is 0.2 mm or less. The lower limit of the thickness of the laminate film is desirably 0.01 mm.

The secondary battery according to the embodiment can be applied to various types of secondary batteries such as a square type, a cylindrical type, a flat type, a thin type, a coin type, and the like. Further, a secondary battery having a bipolar structure may be adopted. This has the advantage that a plurality of cells in series can be made with one cell.

An example of the secondary battery according to the embodiment will be described with reference to FIGS. 2 to 5.

Examples of the secondary battery using a metal container is illustrated in FIGS. 2 and 3.

An electrode group 1 is housed in a rectangular cylindrical metal container 2. The electrode group 1 has a structure in which the positive electrode 3 and the negative electrode 4 are spirally wound so as to have a flat shape with a separator 5 interposed therebetween. An electrolyte (not illustrated) is held by the electrode group 1. As illustrated in FIG. 3, strip-shaped positive electrode leads 6 are electrically connected to each of a plurality of end portions of the positive electrode 3 located on the end surface of the electrode group 1. Further, strip-like negative electrode leads 7 are electrically connected to a plurality of places of the end of the negative electrode 4 located on the end face. A plurality of the positive electrode leads 6 is electrically connected to a positive electrode conductive tab 8 in a state of being bundled into one. The positive electrode lead 6 and the positive electrode conductive tab 8 constitute a positive electrode terminal. Further, the negative electrode lead 7 is connected to a negative electrode conductive tab 9 in a state of being bundled into one. The negative electrode lead 7 and the negative electrode conductive tab 9 constitute a negative electrode terminal. A metal sealing plate 10 is fixed to an opening of the metal container 2 by welding or the like. The positive electrode conductive tab 8 and the negative electrode conductive tab 9 are each pulled out from an extraction hole provided on the sealing plate 10. To avoid a short circuit due to contact with the positive electrode conductive tab 8 and the negative electrode conductive tab 9, the inner circumferential surface of each extraction hole of the sealing plate 10 is covered with an insulating member 11.

Figure 4:
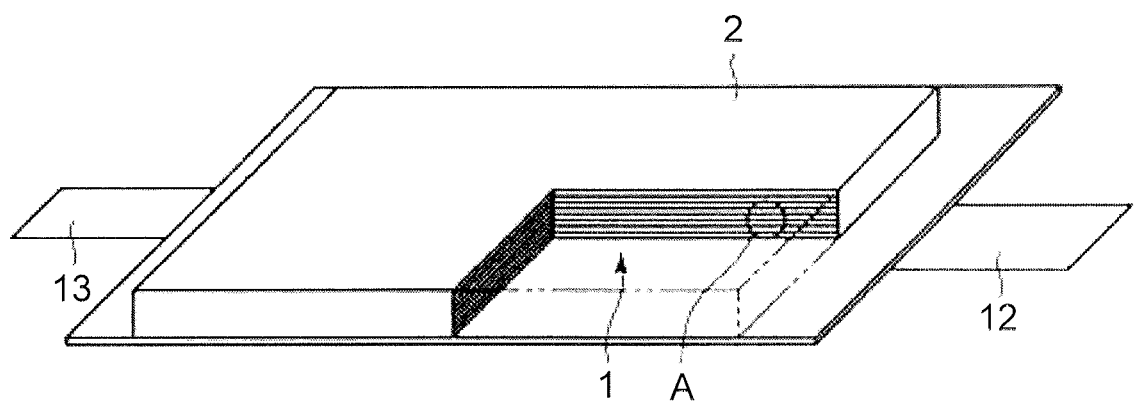
FIG. 4 is a partially cutaway perspective view illustrating the secondary battery according to the first embodiment.
Figure 5:
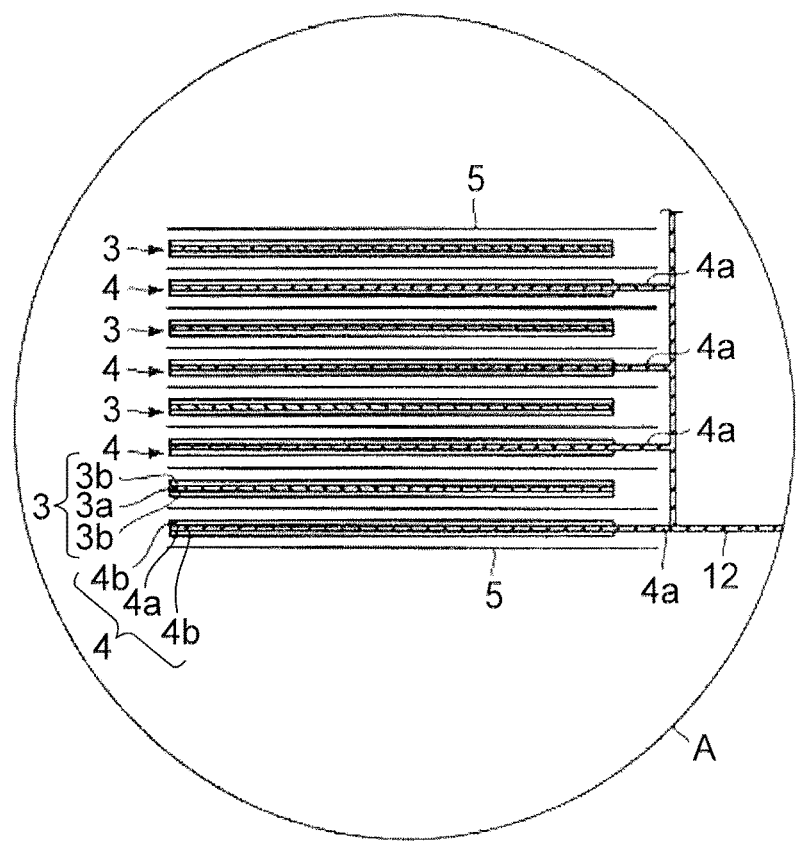
FIG. 5 is an enlarged sectional view of a portion A of FIG. 4.

FIGS. 4 and 5 illustrate examples of a secondary battery using a laminate film exterior member.

The laminated electrode group 1 is housed in a bag-like container 2 made of a laminate film in which a metal layer is interposed between two resin films. The laminated electrode group 1 has a structure in which the positive electrode 3 and the negative electrode 4 are alternately stacked while the separator 5 is interposed therebetween as illustrated in FIG. 5. A plurality of the positive electrodes 3 is present, and each includes a current collector 3a and a positive electrode active material-containing layer 3b formed on both sides of the current collector 3a. A plurality of negative electrodes 4 is present, and each includes a current collector 4a and a negative electrode active material containing layer 4b formed on both sides of the current collector 4a. One side of the current collector 4a of each negative electrode 4 protrudes from the positive electrode 3. The projecting current collector 4a is electrically connected to a strip-like negative electrode terminal 12. A tip of the strip-like negative electrode terminal 12 is pulled out of the container 2 to the outside. Further, although not illustrated, the side of the current collector 3a of the positive electrode 3 opposite to the protruding side of the current collector 4a protrudes from the negative electrode 4. The current collector 3a protruding from the negative electrode 4 is electrically connected to the strip-like positive electrode terminal 13. An end of the strip-like positive electrode terminal 13 is located on the side opposite to the negative electrode terminal 12 and is pulled out from the side of the container 2.

The secondary battery illustrated in FIGS. 2 to 5 can be provided with a safety valve for releasing hydrogen gas generated in the container to the outside. As the safety valve, both of a return type and a non-return type can be used. The return type operates when the internal pressure becomes higher than the set value, and functions as a sealing valve when the internal pressure lowers. The non-return type does not recover functions as a sealing plug once it operates. Further, although the secondary battery illustrated in FIGS. 2 to 5 is a closed type, it can be an open system when it has a circulation system for returning hydrogen gas to water.

According to the above-described embodiment, a secondary battery includes a positive electrode, a negative electrode, and an electrolyte. The negative electrode is provided with a negative electrode current collector provided with a compound including aluminum, and a negative electrode active material including titanium on the negative electrode current collector. The electrolyte contains aqueous electrolyte. A compound containing aluminum is present on at least a part of the granule surface of the negative electrode active material, a ratio of the atomic concentration of the aluminum to the sum of the atomic concentrations of titanium atoms and aluminum atoms on the surface of the negative electrode ({Al atomic concentration/(Al atomic concentration+Ti atomic concentration)}×100) is 3 atm % or more and 30 atm % or less. By providing the secondary battery according to the present embodiment, it is possible to provide a secondary battery excellent in charge and discharge efficiency.

Second Embodiment

According to the second embodiment, it is possible to provide an assembled battery having a secondary battery as a unit cell. The secondary battery of the first embodiment can be used for the secondary battery.

Examples of the assembled battery include a unit including a plurality of unit cells electrically connected in series or in parallel as a constituent unit, a unit including a plurality of unit cells electrically connected in series, or a unit including a unit formed of a plurality of unit cells electrically connected in parallel.

The assembled battery may be housed in a housing. As the housing, a metal made of such as aluminum alloy, iron, or stainless steel, a plastic container, or the like can be used. Further, as for the plate thickness of a container is desirably 0.5 mm or more.

Examples of a form in which a plurality of secondary batteries is electrically connected in series or in parallel include a form in which a plurality of secondary batteries each having a container is electrically connected in series or in parallel, and a form in which a plurality of electrode groups housed in a common housing electrically connected in series or in parallel. In the former example, specifically positive electrode terminals and negative electrode terminals of a plurality of secondary batteries are connected by bus bars made of metal (for example, aluminum, nickel, copper). In the latter example, specifically a plurality of electrode groups are housed in a single housing in a state of being electrochemically insulated by partition walls, and these electrode groups are electrically connected in series. By setting the number of batteries electrically connected in series in the range of 5 to 7, voltage compatibility with a lead storage battery is improved. In order to further enhance the voltage compatibility with the lead storage battery, a configuration in which five or six unit cells are connected in series is preferable.

Figure 6:
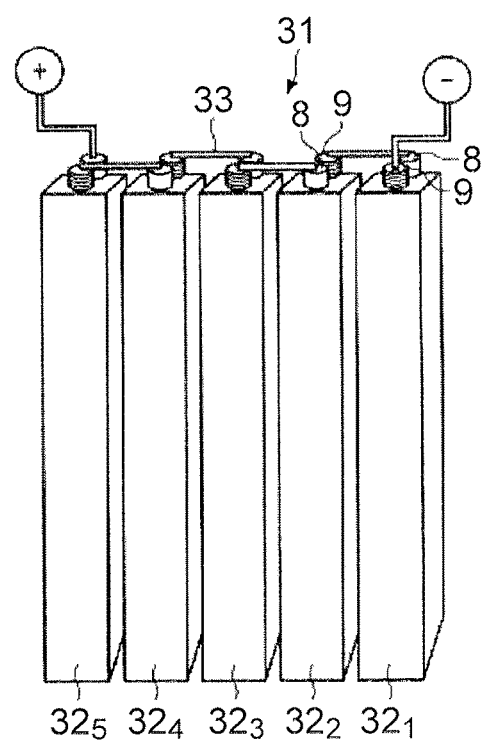
FIG. 6 is a perspective view illustrating an example of an assembled battery according to a second embodiment.

An example of the assembled battery will be described with reference to FIG. 6. The assembled battery 31 illustrated in FIG. 6 includes a plurality of rectangular secondary batteries (for example, FIGS. 2 and 3) $32_1$ to $32_5$ according to the first embodiment as unit cells. The positive electrode conductive tab 8 of the battery $32_1$ and the negative electrode conductive tab 9 of the battery $32_2$ located adjacent thereto are electrically connected by a lead 33. Further, the positive electrode conductive tab 8 of the battery $32_2$ and the negative electrode conductive tab 9 of the battery $32_3$ positioned adjacent thereto are electrically connected by the lead 33. Thus, the batteries $32_1$ to $32_5$ are connected in series.

According to the assembled battery of the second embodiment, since the secondary battery according to the first embodiment is included, it is possible to provide an assembled battery excellent in charge and discharge efficiency.

Third Embodiment

According to a third embodiment, a battery pack is provided. The battery pack includes the secondary battery according to the first embodiment.

The battery pack according to the third embodiment can include one or more secondary batteries (unit cells) according to the above-described first embodiment. A plurality of the secondary batteries that can be included in the battery pack according to the third embodiment can be electrically connected in series, in parallel, or in combination of series and parallel. Further, a plurality of the secondary batteries can also constitute an electrically connected assembled battery. When the assembled battery is composed of a plurality of secondary batteries, the assembled battery of the second embodiment can be used.

The battery pack according to the third embodiment can further include a protection circuit. The protection circuit controls charge and discharge of the secondary battery. Alternatively, a circuit included in a device (for example, an electronic device, an automobile, or the like) using the battery pack as a power supply can be used as a protection circuit of the battery pack.

Further, the battery pack according to the third embodiment can further include an external terminal for energization. The external terminal for energization is for outputting the current from the secondary battery to the outside and/or for inputting the current to the unit cell 51. In other words, when the battery pack is used as a power source, current is supplied to the outside through the external terminal for energization. Further, when the battery pack is charged, a charging current (including regenerative energy of power of a car or the like) is supplied to the battery pack through the external terminal 59 for energization.

Figure 7:
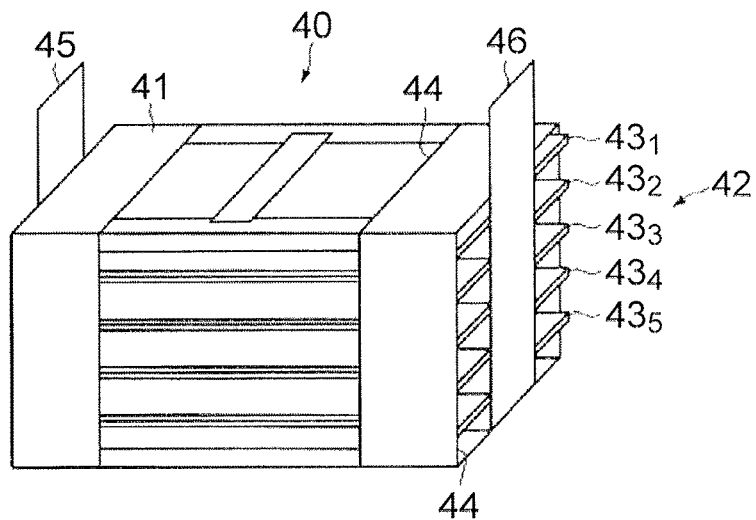
FIG. 7 is a perspective view illustrating an example of a battery pack according to a third embodiment.

An example of a battery pack according to the third embodiment will be described with reference to FIG. 7. FIG. 7 is a schematic perspective view illustrating an example of a battery pack.

The assembled battery 40 includes an assembled battery including secondary batteries illustrated in FIG. 4. The assembled battery 40 includes a housing 41 and an assembled battery 42 housed in the housing 41. The assembled battery 42 is a battery in which a plurality of (for example, five) secondary batteries $43_1$ to $43_5$ is electrically connected in series. The secondary batteries $43_1$ to $43_5$ are stacked in the thickness direction. The housing 41 is provided with openings 44 at each of the top and four side surfaces. The side surfaces of the secondary batteries $43_1$ to $43_5$ from which the positive and negative electrode terminals 12 and 13 protrude are exposed to the opening 44 of the housing 41. An output positive electrode terminal 45 of the assembled battery 42 has a band shape, one end thereof is electrically connected to the positive electrode terminal 13 of any of the secondary batteries $43_1$ to $43_55$, and the other end protrudes from the opening 44 of the housing 41 and protrudes from the top of the housing 41. On the other hand, an output negative electrode terminal 46 of the assembled battery 42 has a band shape, one end thereof is electrically connected to any of the negative electrode terminals 12 of the secondary batteries $43_1$ to $43_5$, and the other end protrude from the opening 44 of the housing 41 and protrude from the top of the housing 41.

Figure 8:
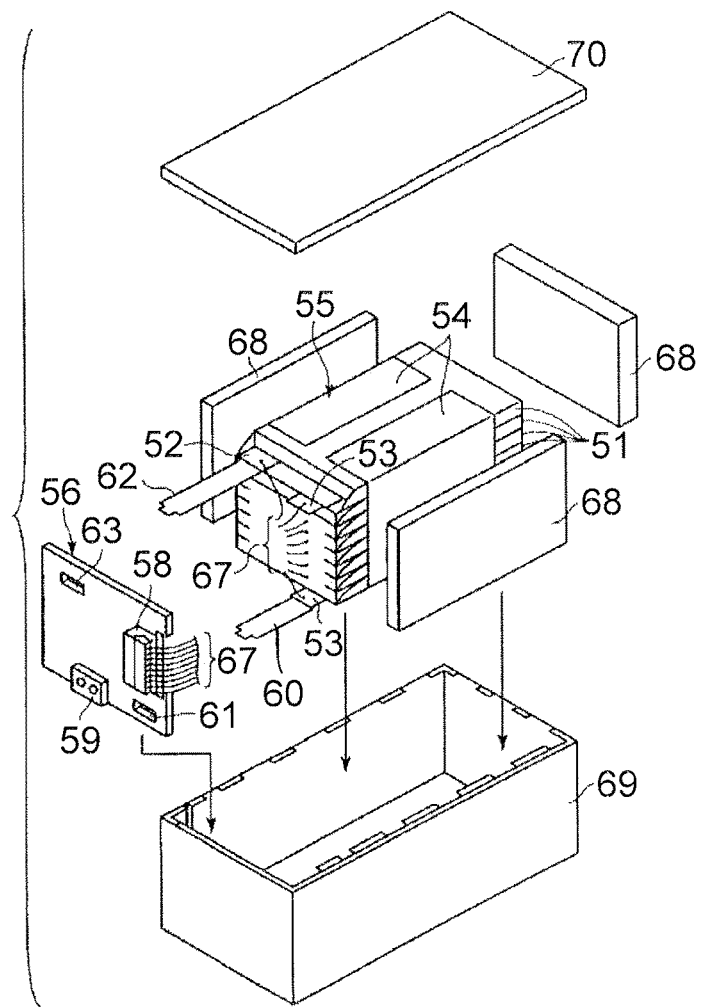
FIG. 8 is an exploded perspective view of another example of the battery pack according to the third embodiment.
Figure 9:
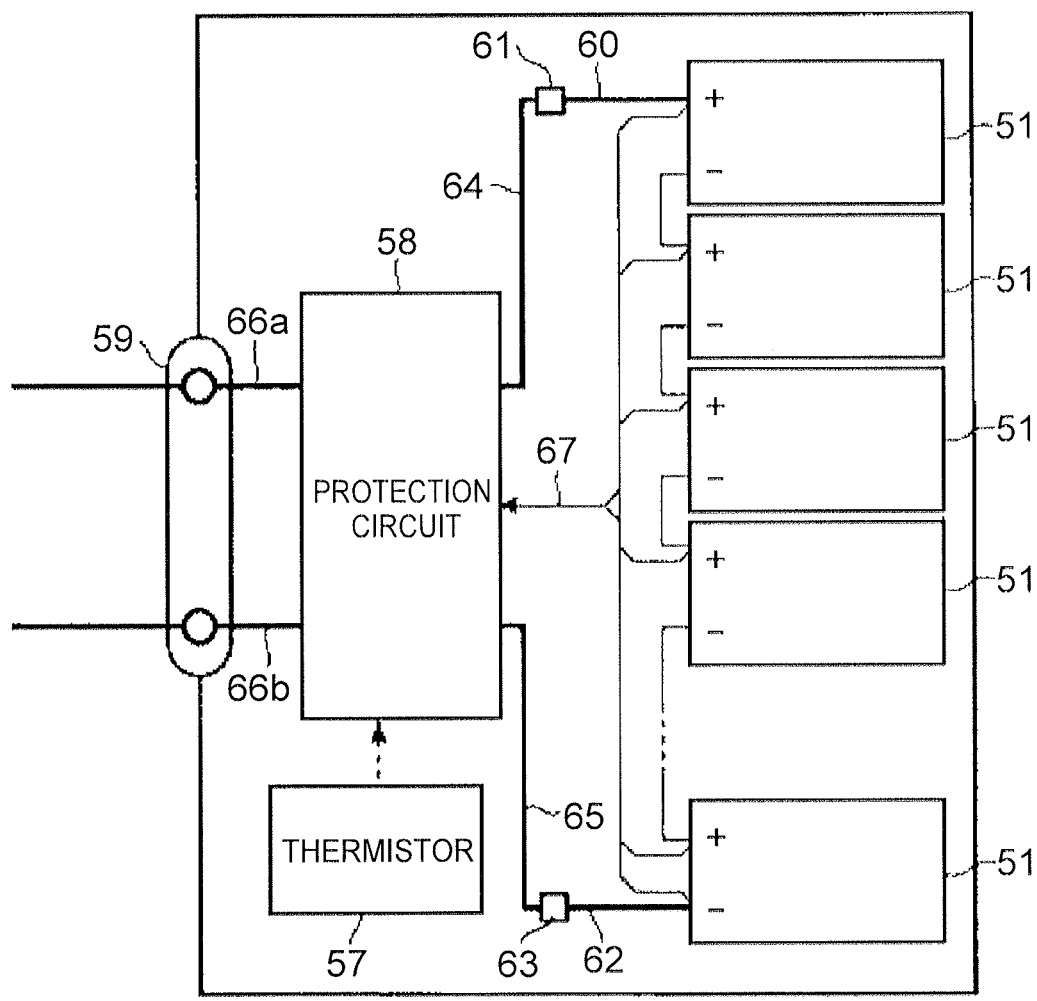
FIG. 9 is a block diagram of an electric circuit of the battery pack of FIG. 7.

Another example of the battery pack according to the third embodiment will be described in detail with reference to FIGS. 8 and 9. FIG. 8 is an exploded perspective view of another example battery pack according to the third embodiment. FIG. 9 is a block diagram illustrating an electric circuit of the battery pack of FIG. 8.

A plurality of unit cells 51 formed of flat secondary batteries is stacked such that a negative electrode terminal 52 and a positive electrode terminal 53 extended to the outside are aligned in the same direction and are fastened by the adhesive tape 54 to form the assembled battery 55. These unit cells 51 are electrically connected in series to each other as illustrated in FIG. 9.

A printed wiring board 56 is disposed to face the side surface of the unit cell 51 from which the negative electrode terminal 52 and the positive electrode terminal 53 extend. As illustrated in FIG. 9, a thermistor 57, a protection circuit 58, and an external terminal 59 for energization are mounted on the printed wiring board 56. An insulating plate (not illustrated) is attached to the surface of the printed wiring board 56 facing the assembled battery 55 to avoid unnecessary connection with the wiring of the assembled battery 55.

A positive electrode lead 60 is connected to the positive electrode terminal 53 located in the lowermost layer of the assembled battery 55, and the tip thereof is inserted into the positive electrode connector 61 of the printed wiring board 56 and electrically connected. A negative electrode lead 62 is connected to the negative electrode terminal 52 located in the uppermost layer of the assembled battery 55, and the tip thereof is inserted into a negative electrode side connector 63 of the printed wiring board 56 and electrically connected. The connectors 61 and 63 are connected to the protection circuit 58 through the wires 64 and 65 formed on the printed wiring board 56.

The thermistor 57 detects the temperature of the unit cell 51, and a detection signal thereof is transmitted to the protection circuit 58. The protection circuit 58 can cut off a plus wiring 66a and a minus wiring 66b between the protection circuit 58 and the external terminal 59 for energization under predetermined conditions. The predetermined condition is, for example, when the detected temperature of the thermistor 57 becomes equal to or higher than a predetermined temperature. Further, the predetermined condition is when overcharge, overdischarge, overcurrent, and the like of the unit cell 51 are detected. The detection of the overcharge and the like is performed for each unit cell 51 or the assembled battery 55. When detecting each unit cell 51, the battery voltage may be detected, or the positive electrode potential or the negative electrode potential may be detected. In the latter case, a lithium electrode used as a reference electrode is inserted into each unit cell 51. In the case of FIGS. 8 and 9, wires 67 for voltage detection are connected to each of the unit cells 51, and detection signals are transmitted to the protection circuit 58 through the wires 67.

Protective sheets 68 made of rubber or resin are respectively disposed on three side surfaces of the assembled battery 55 except for the side surfaces from which the positive electrode terminal 53 and the negative electrode terminal 52 protrude.

The assembled battery 55 is stored in the storage container 69 together with the protective sheets 68 and the printed wiring board 56. That is, the protective sheet 68 is disposed on each of both inner side surfaces in the long side direction and the inner side surface in the short side direction of the storage container 69, and the printed wiring board 56 is disposed on the inner side surface opposite to the short side direction. The assembled battery 55 is positioned in a space surrounded by the protective sheet 68 and the printed wiring board 56. A lid 70 is attached to the upper surface of the storage container 69.

A heat shrinkage tape may be used instead of the adhesive tape 54 for fixing the assembled battery 55. In this case, protective sheets are disposed on both side surfaces of the assembled battery, and the heat shrinkable tape is circulated, and then the heat shrinkable tape is heat shrunk to bind the assembled battery.

Although the unit cells 51 are connected in series in FIGS. 8 and 9, they may be connected in parallel to increase the battery capacity. Alternatively, series connection and parallel connection may be combined. Furthermore, assembled battery packs can be connected in series and/or in parallel.

Further, the aspect of the battery pack is appropriately changed depending on the application. As the application, the battery pack, in which charge/discharge at high current is desired, is preferable. Specifically, it is used as a power source for digital cameras, two- to four-wheel hybrid electric vehicles, two- to four-wheel electric vehicles, assist bicycles, and vehicles such as railway vehicles, and also as a stationary battery. In particular, automotive applications are preferred.

In a vehicle such as a car equipped with the battery pack according to the third embodiment, the battery pack recovers, for example, regenerative energy of the power of the vehicle.

According to the battery pack of the third embodiment described above, since the secondary battery of the first embodiment is included, it is possible to provide a battery pack excellent in charge and discharge efficiency.

Fourth Embodiment

According to a fourth embodiment, a vehicle is provided. This vehicle is equipped with the battery pack according to the third embodiment.

In the vehicle according to the fourth embodiment, a battery pack recovers, for example, regenerative energy of vehicle power.

Examples of the vehicle according to the fourth embodiment include, for example, two- to four-wheel hybrid electric vehicles, two- to four-wheel electric vehicles, assist bicycles, and railway vehicles.

The mounting position of the battery pack in the vehicle according to the fourth embodiment is not particularly limited. For example, when the battery pack is mounted in a car, the battery pack can be mounted in the engine room of a vehicle, at the rear of a vehicle body, or under a seat.

Next, an example of a vehicle according to the fourth embodiment will be described with reference to the drawings.

Figure 10:
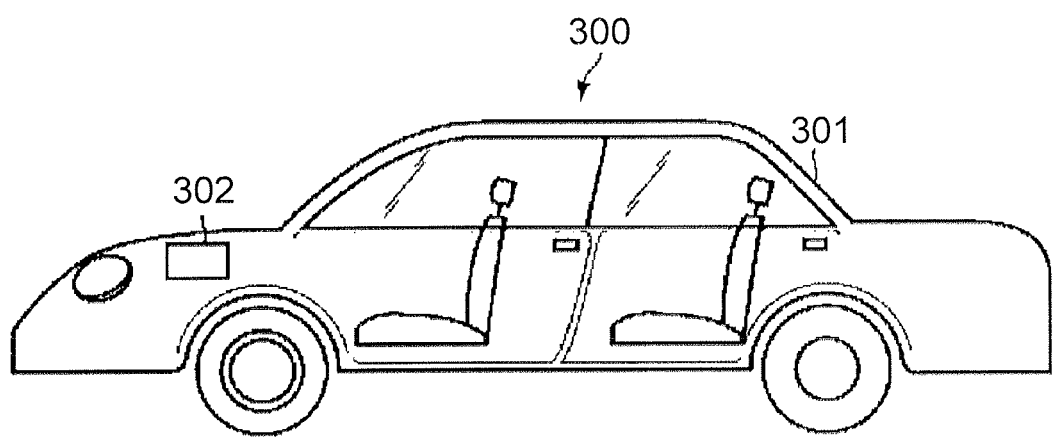
FIG. 10 is a cross-sectional view schematically illustrating a vehicle example according to a fourth embodiment.

FIG. 10 is a cross-sectional view schematically illustrating an example of the vehicle according to the fourth embodiment.

A vehicle 200 illustrated in FIG. 10 includes a vehicle body 201 and a battery pack 202. The battery pack 202 may be the battery pack according to the third embodiment.

The vehicle 200 illustrated in FIG. 10 is a four-wheeled automobile. Examples of the vehicle 200 include two- to four-wheel hybrid electric vehicles, two- to four-wheel electric vehicles, assist bicycles, and railway vehicles.

The vehicle 200 may have a plurality of the battery packs 202 mounted thereon. In this case, the battery packs 202 may be connected in series or in parallel, or may be connected in combination of series and parallel.

The battery pack 202 is mounted in an engine room located in front of the vehicle body 201. The mounting position of the battery pack 202 is not particularly limited. The battery pack 202 may be mounted behind the vehicle body 201 or under a seat. The battery pack 202 can be used as a power source of the vehicle 200. Further, the battery pack 202 can recover regenerative energy of the power of the vehicle 200.

Next, an embodiment of a vehicle according to the fourth embodiment will be described with reference to FIG. 11.

Figure 11:
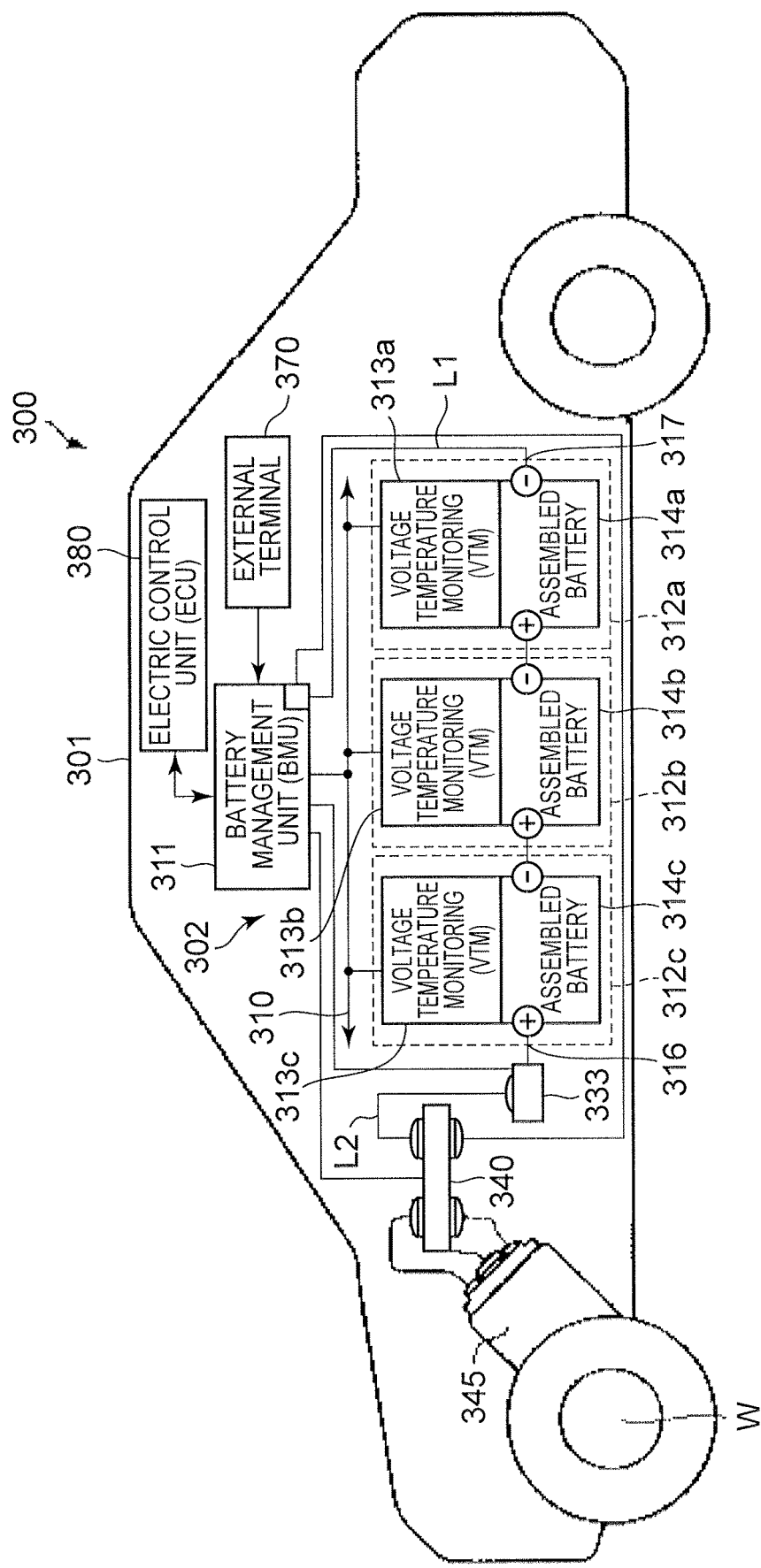
FIG. 11 is a diagram schematically illustrating a vehicle of another example according to the fourth embodiment.

FIG. 11 is a diagram schematically illustrating an example of the vehicle according to the fourth embodiment. A vehicle 300 illustrated in FIG. 11 is an electric vehicle.

A vehicle 300 illustrated in FIG. 11 includes a vehicle main body 301, a vehicle power source 302, a vehicle electric control unit (ECU) 380 as an upper control unit of the vehicle power source 302, an external terminal (a terminal for connecting to an external power source) 370, an inverter 340, and a drive motor 345.

The vehicle 300 has a vehicle power source 302 mounted, for example, in an engine room, at the rear of a vehicle body, or under a seat. Note that, FIG. 11 schematically illustrates a mounting position of the vehicle power source 302 in the vehicle 300.

The vehicle power source 302 includes a plurality of (for example, three) battery packs 312a, 312b, and 312c, a battery management unit (BMU) 311, and a communication bus 310.

The three battery packs 312a, 312b, and 312c are electrically connected in series. The battery pack 312a includes an assembled battery 314a and an assembled battery monitoring device (VTM: Voltage Temperature Monitoring) 313a. The battery pack 312b includes an assembled battery 314b and an assembled battery monitoring device 313b. The battery pack 312c includes an assembled battery 314c and an assembled battery monitoring device 313c. The battery packs 312a, 312b, and 312c can be removed independently of one another and can be replaced with another battery pack 312.

Each of the assembled batteries 314a to 314c includes a plurality of single cells connected in series. At least one of a plurality of unit cells is the secondary battery according to the first embodiment. The assembled batteries 314a to 314c each perform charging and discharging through the positive electrode terminal 316 and the negative electrode terminal 317.

The battery management device 311 communicates with the assembled battery monitoring devices 313a to 313c in order to collect information on maintenance of the vehicle power source 302, and collects information on the voltage, temperature, and the like of unit cells included in the assembled batteries 314a to 314c included in the vehicle power source 302.

A communication bus 310 is connected between the battery management device 311 and the assembled battery monitoring devices 313a to 313c. The communication bus 310 is configured so as to share one set of communication lines among a plurality of nodes (a battery management device and one or more battery pack monitoring devices). The communication bus 310 is a communication bus configured based on, for example, a control area network (CAN) standard.

The assembled battery monitoring devices 313a to 313c measure the voltage and temperature of each of the unit cells constituting the assembled batteries 314a to 314c based on a command from the battery management device 311 by communication. However, the temperature can be measured at only a few points per one assembled battery, and it is not necessary to measure the temperatures of all the unit cells.

The vehicle power source 302 can also have an electromagnetic contactor (for example, a switch device 333 illustrated in FIG. 11) for turning on and off the connection for the positive electrode terminal 316 and the negative electrode terminal 317. The switch device 333 includes a precharge switch (not illustrated) that is turned on when charging of the assembled batteries 314a to 314c is performed and a main switch (not illustrated) that turns on when battery output is supplied to a load. The precharge switch and the main switch are provided with a relay circuit (not illustrated) turned on or off by a signal supplied to a coil disposed in the vicinity of the switch element.

The inverter 340 converts the input DC voltage into a three-phase alternating current (AC) high voltage for driving a motor. Three-phase output terminals of the inverter 340 are connected to respective three-phase input terminals of the drive motor 345. The inverter 340 controls the output voltage based on a control signal from the battery management device 311 or the vehicle ECU 380 for controlling the entire operation of the vehicle.

The drive motor 345 is rotated by the power supplied from the inverter 340. This rotation is transmitted to an axle and a drive wheel W, for example, via a differential gear unit.

Further, although not illustrated, the vehicle 300 is provided with a regenerative braking mechanism. The regenerative braking mechanism rotates the drive motor 345 when the vehicle 300 is braked and converts kinetic energy into regenerative energy as electrical energy. The regenerative energy recovered by the regenerative braking mechanism is input to the inverter 340 and converted into a direct current. The direct current is input to the vehicle power source 302.

One terminal of a connection line L1 is connected to the negative electrode terminal 317 of the vehicle power source 302 via a current detection unit (not illustrated) in the battery management device 311. The other terminal of the connection line L1 is connected to a negative input terminal of the inverter 340.

One terminal of the connection line L2 is connected to the positive electrode terminal 316 of the vehicle power source 302 via the switch device 333. The other terminal of the connection line L2 is connected to a positive input terminal of the inverter 340.

An external terminal 370 is connected to the battery management device 311. The external terminal 370 can be connected to, for example, an external power source.

The vehicle ECU 380 performs coordinated control of the battery management device 311 together with other devices in response to an operation input from a driver or the like to manage the entire vehicle. Between the battery management device 311 and the vehicle ECU 380, data transfer regarding maintenance of the vehicle power source 302, such as the remaining capacity of the vehicle power source 302, is performed through a communication line.

The vehicle according to the fourth embodiment includes the battery pack according to the third embodiment. That is, since the vehicle according to the fourth embodiment is excellent in charge and discharge efficiency since the battery pack having high charge and discharge efficiency and storage performance is provided, a vehicle having high reliability can be provided.

Fifth Embodiment

According to a fifth embodiment, a stationary power source is provided. The stationary power source includes the battery pack according to the third embodiment. The stationary power source may be mounted with the assembled battery according to the second embodiment or the secondary battery according to the first embodiment instead of the battery pack according to the third embodiment.

The stationary power source according to the fifth embodiment is mounted with the battery pack according to the third embodiment. Therefore, the stationary power source according to the fifth embodiment can realize a long life.

Figure 12:
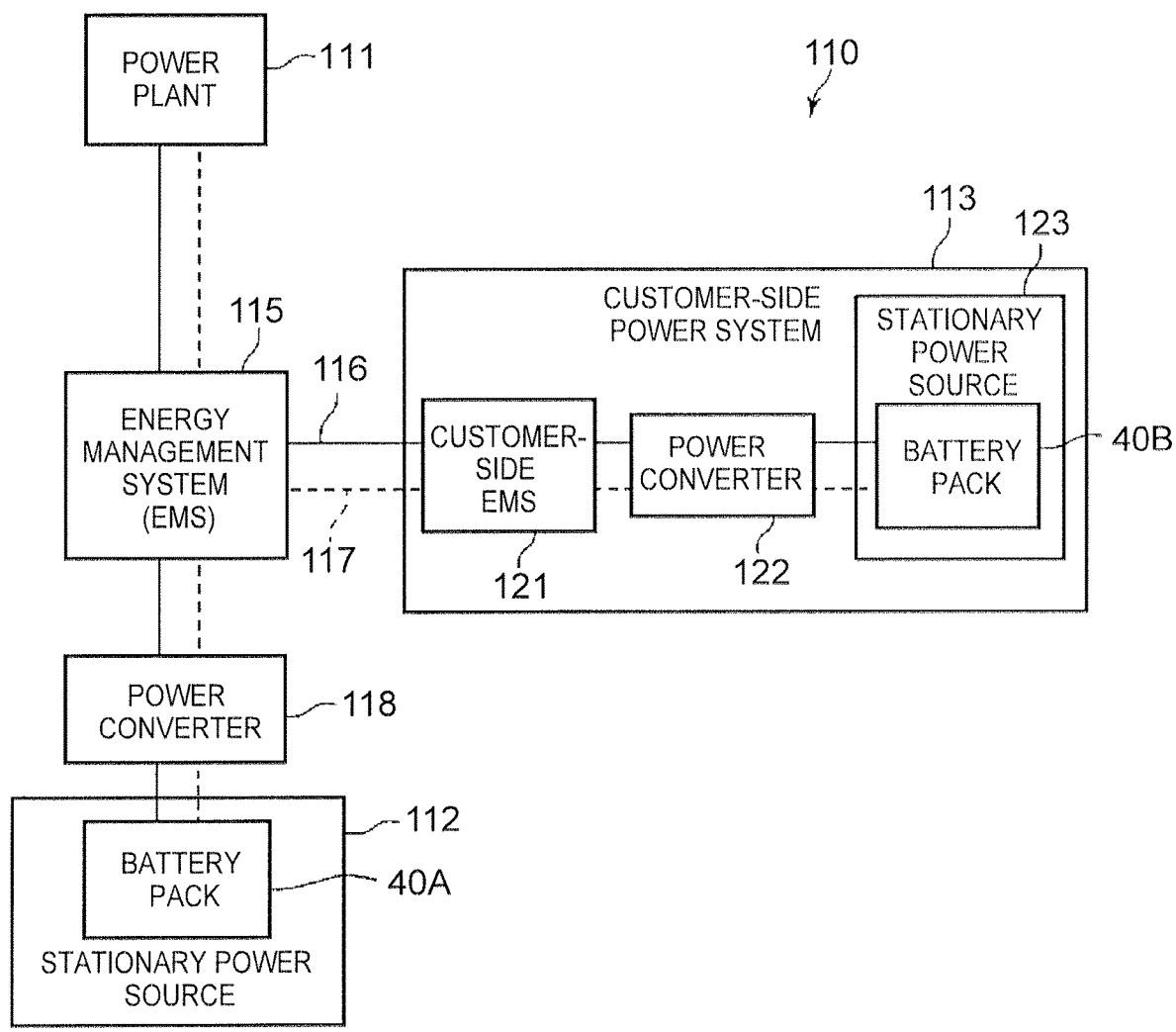
FIG. 12 is a block diagram illustrating an example of a system including a stationary power source according to a fifth embodiment.

FIG. 12 is a block diagram illustrating an example of a system including the stationary power source according to the fifth embodiment. FIG. 12 is a view illustrating an application example to the stationary power sources 112 and 123 as an example of using the battery packs 40A and 40B according to the third embodiment. In the example illustrated in FIG. 12, a system 110 is indicated in which stationary power sources 112 and 123 are used. The system 110 includes a power plant 111, a stationary power source 112, a customer-side power system 113, and an energy management system (EMS) 115. Further, in the system 110, a power network 116 and a communication network 117 are formed, and the power plant 111, the stationary power source 112, the customer-side power system 113, and the EMS 115 are connected via the power network 116 and the communication network 117. The EMS 115 performs control to stabilize the entire system 110 by utilizing the power network 116 and the communication network 117.

The power plant 111 generates a large amount of power by fuel sources such as thermal power and nuclear power. Power is supplied from the power plant 111 through the power network 116 and the like. In addition, the battery pack 40A is mounted on the stationary power source 112. The battery pack 40A can store electric power and the like supplied from the power plant 111. In addition, the stationary power source 112 can supply the power stored in the battery pack 40A through the power network 116 or the like. The system 110 is provided with a power converter 118. The power converter 118 includes a converter, an inverter, a transformer, and the like. Therefore, the power converter 118 can perform conversion between direct current and alternating current, conversion between alternating currents with different frequencies relative to each other, and transformation (step-up and step-down). Therefore, the power converter 118 can convert the power from the power plant 111 into power that can be stored in the battery pack 40A.

The customer-side power system 113 includes a power system for factories, a power system for buildings, a power system for homes, and the like. The customer-side power system 113 includes a customer-side EMS 121, a power converter 122, and a stationary power source 123. The battery pack 40B is mounted on the stationary power source 123. The customer-side EMS 121 performs control to stabilize the customer-side power system 113.

The power from the power plant 111 and the power from the battery pack 40A are supplied to the customer-side power system 113 through the power network 116. The battery pack 40B can store the power supplied to the customer-side power system 113. Further, the power converter 122 includes a converter, an inverter, a transformer, and the like, similarly to the power converter 118. Therefore, the power converter 122 can perform conversion between direct current and alternating current, conversion between alternating currents with different frequencies relative to each other, and transformation (step-up and step-down). Therefore, the power converter 122 can convert the power supplied to the customer-side power system 113 into power that can be stored in the battery pack 40B.

The power stored in the battery pack 40B can be used, for example, for charging a vehicle such as an electric car. The system 110 may also be provided with a natural energy source. In this case, the natural energy source generates power by natural energy such as wind power and solar light. Then, power is supplied from the natural energy source through the power network 116 in addition to the power plant 111.

Examples are described below, but the embodiments are not limited to the examples listed below.

First Example

<Preparation of Negative Electrode>

$LiMn_2O_4$ (4.0 g) as a positive electrode active material, acetylene black (0.20 g) as a conductive agent, and PVDF dispersion (an NMP (N-methyl-2-pyrrolidone) solution with a solid fraction of 8%, 5.0 g) as a binder and NMP (0.5 g) were added. The mixture was mixed for three minutes using a kneading machine to obtain a viscous slurry. The slurry was applied on one side of a 20 μm thick Ti foil. Thereafter, a laminate was obtained by distilling a solvent. Then, the laminate was then performed rolling (roll press). Thereafter, the laminate was dried in a vacuum oven at 130° C. for two hours and then punched into a circle having a diameter of 10 mm. The basis weight per unit area of the obtained positive electrode was 150 g/m² and the density was 1.94 g/cm³.

<Preparation of Negative Electrode>

$Li_4Ti_5O_{12}$ (4.0 g) as a negative electrode active material, graphite (0.40 g) as a conductive agent, NMP (N-methyl-2-pyrrolidone) solution (solid content 15 wt %, 0.29 g) of polyvinyl butyral as a binder, NMP (2.0 g) were added. The mixture was mixed for three minutes using a kneading machine to obtain a slurry. This slurry was applied on one side of a 30 μm thick Al foil. Thereafter, a laminate was obtained by distilling a solvent. Then, the laminate was pressed by a roll press. Thereafter, the laminate was dried in a vacuum oven at 130° C. for three hours and then punched into a circle having a diameter of 10 mm. The basis weight of the obtained negative electrode was 50 g/m², and the density was 2.1 g/cm³.

<Preparation of Electrolyte>

Lithium chloride (10.17 g), lithium hydroxide monohydrate (8.39 g, 0.20 mol), and NMP (20 mL) were added to an aqueous solution (180 mL) of lithium chloride of 12 mol/L, and the solution was obtained by well stirring. The electrolyte of the first example was obtained by adding 1 wt % of a compound A ($C_{12}H_{25}$—O—$(CH_2CH(CH_3)O)_y$—$(CH_2CH_2O)_xH$) as a first compound.

<Preparation of Test Cell>

An anodized aluminum plate was fixed on a plastic plate, and a negative electrode was fixed thereon. The Ti plate was fixed on another plastic plate, and the positive electrode was fixed thereon. On the negative electrode, the prepared electrolyte (180 μL) was dropped, and a $Li_{1.3}Al_{0.3}Ti_{1.7}(PO_4)_3$ (hereinafter abbreviated as LATP) solid electrolyte membrane was placed thereon and adhered. On the opposite side of the same LATP membrane, an aqueous solution (180 μL) of lithium chloride of 12 mol/L was dropped, and the positive electrode was placed thereon and attached thereto, and then fixed with a screw. Then it was waited for twenty four hours.

<Cell Evaluation>

About the evaluation cell prepared in this way, a constant current charge/discharge test, energy dispersive X-ray spectroscopy (SEM-EDX) analysis, and measurement of interfacial tension of the electrolyte were performed. The results are summarized in Table 1. The battery performance and the atomic ratio of aluminum ({Al atomic concentration/(Al atomic concentration+Ti atomic concentration)}×100) obtained from the SEM-EDX analysis are indicated. In addition, since the second comparative example does not contain aluminum in a battery, regarding the atomic ratio of aluminum, it describes with N/A as not applicable.

In Table 1, second to fourth examples and first and second comparative examples described later are also described.

<Constant Current Charge and Discharge Test>

Both charge and discharge were performed at 1 C rate. In addition, at the time of charging, the earlier one among until the current value reached 0.5 C, until the charging time reached 70 minutes, and until the charge capacity reached 170 mAh/g was set as the termination condition. The termination condition was set to seventy minutes after discharge.

The above charge was performed once and the above discharge was performed once as one cycle of charge/discharge, and the charge/discharge was repeated twenty cycles. The charge capacity and the discharge capacity in each charge and discharge cycle were each measured. From the obtained result, charge and discharge efficiency was calculated for each cycle according to the following formula (1).

Charge and discharge efficiency (%)=100×{discharge capacity (mAh/g)/charge capacity (mAh/g)} (1)

The average value from the fifth cycle to the twentieth cycle of the charge and discharge efficiency thus obtained was calculated and indicated in Table 1.

<Energy Dispersive X-Ray Spectroscopy (SEM-EDX) Analysis>

Energy dispersive X-ray spectroscopy (SEM-EDX) analysis was performed using Hitachi High-Technologies SU8020. The magnification was 200 x, the acceleration voltage of the electron beam was 15 keV, and average field of view was analyzed at five locations. When an Al peak was not detected, it is described as N/A as not applicable.

Second Example

Except that the compound B ($C_4H_9O$—$(CH_2CH_2O)_x$—$[CH_2CH(CH_3)O]_yH$) was added to an electrolyte as a first compound, a test battery was prepared and tested by the same method as described in the first example.

Third Example

Except that the compound C (OH—$(CH_2CH_2O)_z$—$(CH_2CH(CH_3)O)_y$—$(CH_2CH_2O)_xH$) was added to an electrolyte as a first compound, a test battery was prepared and tested by the same method as described in the first example.

Fourth Example

Except that the first compound was not added to an electrolyte, a test battery was prepared and tested by the same method as described in the first example.

First Comparative Example

Except that a zinc (Zn) foil (50 μm thick) was used as a negative electrode current collector, a test battery was prepared and tested by the same manner as described in the first example.

Second Comparative Example

Except that a Zn foil (50 μm thick) was used as a negative electrode current collector and the first compound was not added to an electrolyte, a test battery was prepared and tested by the same manner as described in the first example.

TABLE 1

| | Negative electrode current collector | First compound | {Al atomic concentration/ (Al atomic concentration + Ti atomic concentration)} × 100) (atm %) | Charge and discharge efficiency (%) |
|---|---|---|---|---|
| First example | Al | A | 20.5 | 97.6 |
| Second example | Al | B | 27.8 | 96.8 |
| Third example | Al | C | 10.9 | 97.9 |
| Fourth example | Al | — | 3.8 | 97.1 |
| First comparative example | Zn | A | N.A. | 95.3 |
| Second comparative example | Zn | — | N.A. | 94.3 |

As apparent from Table 1, the first to fourth examples in which the atomic ratio of aluminum is 3 atm % or more and 30 atm % or less are superior in charge and discharge efficiency to the first and second comparative examples. From this result, it can be inferred that the electrolysis reaction of water has been suppressed in the examples, and the insertion and removal of the carrier (lithium ion) to and from the negative electrode active material has been efficiently performed.

Further, when the atomic ratio of aluminum is 10 atm % or more and 21 atm % or less, more excellent charge and discharge efficiency can be achieved.

Several embodiments of the present invention have been described. However, those embodiments are given only as an example, and it is not intended to limit the scope of the invention to them. The embodiments can be carried out in various other forms, and within a range not departing from the gist of the invention, various omissions, substitutions, and modifications can be carried out. As being included in the scope and gist of the explanations, those embodiments and modifications are also included in the inventions described in claims and their equivalents.

What is claimed is:

1. A secondary battery, comprising:
a positive electrode;
a negative electrode provided with a negative electrode current collector having a compound including aluminum, and a negative electrode active material including titanium on the negative electrode current collector; and
an aqueous electrolyte,
wherein a compound containing aluminum is present on at least a part of a granule surface of the negative electrode active material,
the compound containing aluminum is present on the surface of the granule such that the compound containing aluminum is formed on the surface where negative electrode active materials of the negative electrode do not contact with one another, and
a ratio of an atomic concentration of aluminum atoms to sum of atomic concentrations of aluminum atoms and titanium atoms on a surface of the negative electrode ({Al atomic concentration/(Al atomic concentration+Ti atomic concentration)}×100) is 3 atm % or more and 30 atm % or less.

2. The secondary battery according to claim 1, wherein an atomic ratio of the aluminum is 10 atm % or more and 21 atm % or less.

3. The secondary battery according to claim 1, wherein the pH of the aqueous electrolyte is greater than 7.

4. The secondary battery according to claim 1, wherein the aqueous electrolyte further comprises a first compound containing an organic compound including a hydrophilic part and a hydrophobic part in one molecule.

5. The secondary battery according to claim 4, wherein the organic compound is a nonionic surfactant.

6. The secondary battery according to claim 5, wherein the nonionic surfactant comprises one or more selected from a group consisting of polyoxyethylene alkyl ether and polyoxyalkylene alkyl ether.

7. The secondary battery according to claim 1, wherein the negative electrode active material containing titanium contains at least one compound selected from a group consisting of titanium oxide, lithium titanium oxide, and lithium titanium composite oxide.

8. The secondary battery according to claim 1, wherein the negative electrode has negative active electrode materials and one of the negative electrode active materials contact another of the negative electrode active materials.

9. A battery pack comprising the secondary battery according to claim 1.

10. The battery pack according to claim 9, further comprising:
an external terminal for energizing; and
a protection circuit.

11. The battery pack according to claim 9, comprising a plurality of the secondary batteries,
wherein the secondary batteries are electrically connected in series, in parallel, or in combination in series and in parallel.

12. A vehicle equipped with the battery pack according to claim 9.

13. The vehicle according to claim 12, wherein the battery pack recovers regenerative energy of power of the vehicle.

14. A stationary power source comprising the battery pack according to claim 9.

* * * * *